United States Patent
Freeman et al.

(10) Patent No.: US 10,948,564 B2
(45) Date of Patent: Mar. 16, 2021

(54) NETWORKABLE DIGITAL LIFE JACKETS AND ASSOCIATED METHODS

(71) Applicant: The Boeing Company, Chicago, IL (US)

(72) Inventors: Roland Nelson Freeman, Goose Creek, SC (US); Karrie Ruth Guymon, Redmond, WA (US); Robert John Rencher, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 72 days.

(21) Appl. No.: 16/504,008

(22) Filed: Jul. 5, 2019

(65) Prior Publication Data

US 2021/0003658 A1 Jan. 7, 2021

(51) Int. Cl.
*B63C 9/11* (2006.01)
*G01S 5/02* (2010.01)
*G08B 25/01* (2006.01)
*B63B 34/00* (2020.01)

(52) U.S. Cl.
CPC ............ *G01S 5/0231* (2013.01); *B63B 34/00* (2020.02); *B63C 9/11* (2013.01); *G08B 25/016* (2013.01); *B63B 2201/16* (2013.01); *B63B 2213/02* (2013.01); *G01S 2205/006* (2013.01)

(58) Field of Classification Search
CPC . B63B 34/00; B63B 2201/16; B63B 2213/02; G01S 5/0231; G01S 2205/006; B63C 9/11; G08B 25/016
See application file for complete search history.

(56) References Cited

U.S. PATENT DOCUMENTS

| 7,854,639 | B1 | 12/2010 | Leal et al. |
| 2008/0258968 | A1 | 10/2008 | Kim |
| 2015/0209622 | A1* | 7/2015 | Guinyard ............... A63B 35/08 440/38 |
| 2016/0119424 | A1* | 4/2016 | Kane ..................... H04L 67/10 709/203 |
| 2017/0069195 | A1* | 3/2017 | Shau ................... G08B 21/088 |
| 2017/0213525 | A1* | 7/2017 | Tamegai ................. G06F 3/147 |
| 2018/0066951 | A1 | 3/2018 | Rencher et al. |
| 2019/0066061 | A1 | 2/2019 | Rencher et al. |

OTHER PUBLICATIONS

PassageMaker, "Safety Company Launches Life Jackets With Built-In AIS Systems," dated Nov. 14, 2014, retrieved Apr. 10, 2019, from [https://www.passagemaker.com/trawler-news/safety-company-launches-life-jackets-with-built-in-ais], 2 pages.

* cited by examiner

*Primary Examiner* — Stephen P Avila
(74) *Attorney, Agent, or Firm* — Hanley, Flight & Zimmerman, LLC

(57) ABSTRACT

Networkable digital life jackets and associated methods are disclosed. An example life jacket includes a state manager and a swarm manager. The state manager is configured to selectively operate the life jacket in one of multiple operational states of the life jacket based on data obtained from one or more sensors of the life jacket. The swarm manager is configured to form a swarm network including the life jacket and one or more other life jackets.

22 Claims, 13 Drawing Sheets

US 10,948,564 B2

NETWORKABLE DIGITAL LIFE JACKETS AND ASSOCIATED METHODS

FIELD OF THE DISCLOSURE

This disclosure relates generally to life jackets and, more specifically, to networkable digital life jackets and associated methods.

BACKGROUND

Vehicles configured to travel over, on and/or under water and station structures such as offshore platforms are commonly equipped with life jackets that are available to be worn by the passengers of the vehicle. For example, commercial aircraft are commonly equipped with passenger life jackets that are stowed aboard (e.g., under the passenger seats of) the aircraft. In some known vehicle-based life jacket implementations, each life jacket stowed aboard the vehicle includes a radio frequency identification (RFID) tag attached to and/or embedded within the life jacket that can actively and/or passively inform an interrogation device (e.g., an RFID scanner) of the status of the life jacket. For example, in some such implementations, information obtainable via the RFID tag of each life jacket can include a unique identifier, an assigned storage location, a current location, and/or an expiration date of the life jacket. Such information can be used by the interrogation device to monitor the location status and/or the health status of the life jacket.

SUMMARY

Networkable digital life jackets and associated methods are disclosed herein. In some examples, a life jacket is disclosed. In some disclosed examples, the life jacket includes a state manager and a swarm manager. In some disclosed examples, the state manager is configured to selectively operate the life jacket in one of multiple operational states of the life jacket based on data obtained from one or more sensors of the life jacket. In some disclosed examples, the swarm manager is configured to form a swarm network including the life jacket and one or more other life jackets.

In some examples, a method is disclosed. In some disclosed examples, the method includes selectively operating a life jacket, by executing a computer-readable instruction with one or more processors of the life jacket, in one of multiple operational states of the life jacket based on data obtained from one or more sensors of the life jacket. In some disclosed examples, the method further includes forming a swarm network including the life jacket and one or more other life jackets.

In some examples, a non-transitory computer-readable medium including instructions is disclosed. In some disclosed examples, the instructions, when executed, cause one or more processors of a life jacket to selectively operate the life jacket in one of multiple operational states of the life jacket based on data obtained from one or more sensors of the life jacket. In some disclosed examples, the instructions, when executed, further cause the one or more processors to form a swarm network including the life jacket and one or more other life jackets.

Figure 1:
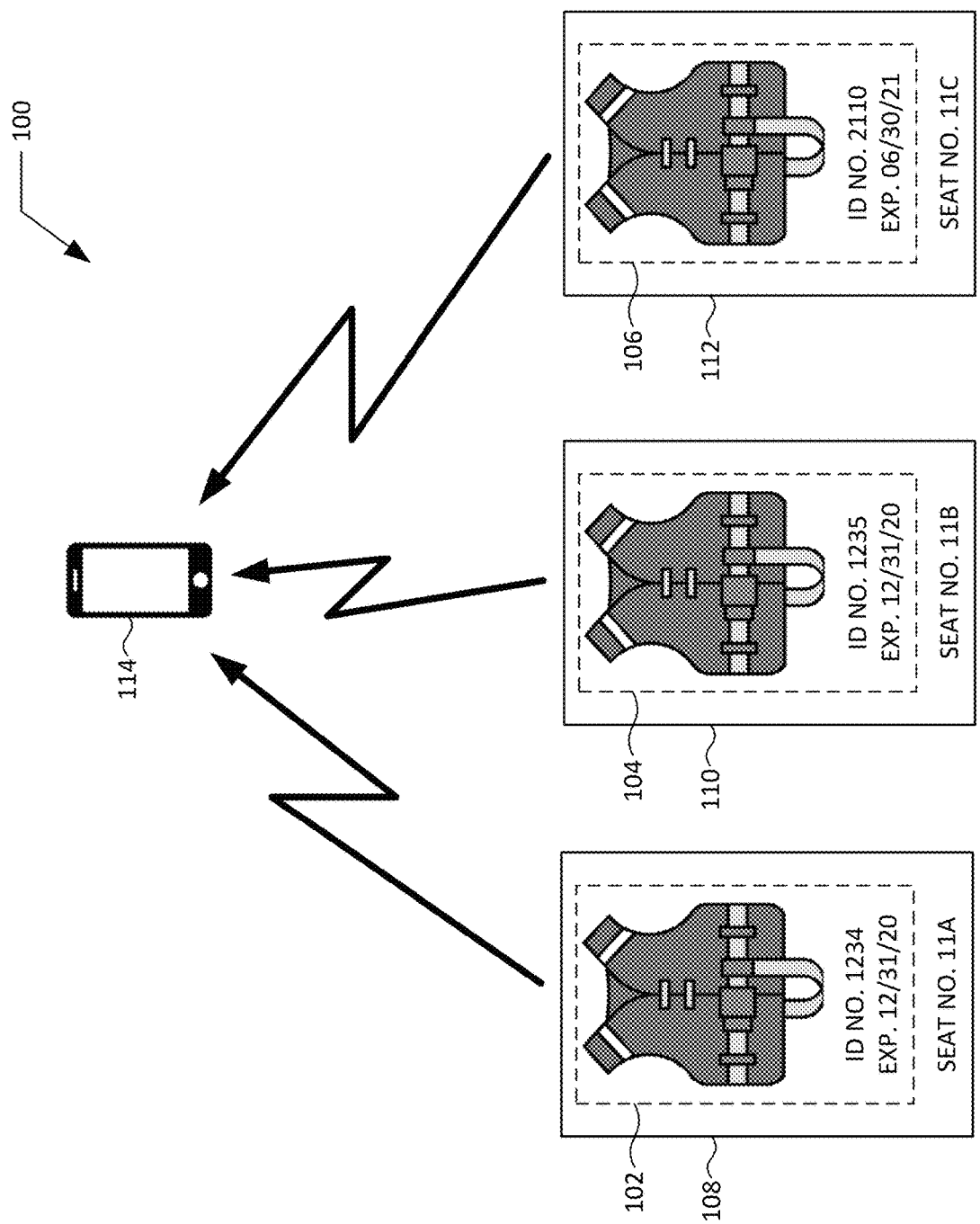
FIG. 1 illustrates a first example environment in which one or more example life jacket(s) can be implemented in accordance with teachings of this disclosure.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In some known vehicle-based life jacket implementations, each life jacket stowed aboard the vehicle includes a radio frequency identification (RFID) tag attached to and/or embedded within the life jacket that can actively and/or passively inform an interrogation device (e.g., an RFID scanner) of the status of the life jacket. For example, in some such implementations, information obtainable via the RFID tag of each life jacket can include a unique identifier, an assigned storage location, a current location, and/or an expiration date of the life jacket. Such information can be used by the interrogation device to monitor the location status and/or the health status of the life jacket.

The known vehicle-based life jacket implementations described above have numerous shortcomings. For example, the amount and/or type of data that can be communicated from each life jacket is relatively limited and non-informative relative to events that may occur in association with the maintenance and/or use of the life jacket. As another example, the life jackets of such known implementations lack the ability to communicate with one another, and/or to form a communication network including each other.

Example networkable digital life jackets and associated methods are disclosed herein. Unlike the known life jackets and/or known vehicle-based life jacket implementations described above, life jackets of the known implementations, example digital life jackets disclosed herein advantageously include an array and/or collection of sensor(s) and/or processing element(s) that are individually and/or collectively configured to determine and/or generate transmittable status data indicating whether the life jacket has moved (e.g., relative to an assigned storage location) by more than a threshold amount, whether the life jacket has been installed (e.g., placed on and/or connected to) a user, whether the life jacket has been immersed in water, and/or user health status associated with a user wearing the life jacket. Such detailed status data can advantageously be transmitted from example digital life jackets disclosed herein to rescue vehicles and/or services to inform such rescue vehicles and/or services in a manner that can be of critical importance and/or assistance with regard to implementing efficient rescue efforts.

As another advantage, example digital life jackets disclosed herein are networkable with one another. In this regard, example digital life jackets disclosed herein are advantageously structured and/or configured to communicate with one another via a swarm network formed by two or more of the life jackets. Example digital life jackets disclosed herein identify a lead life jacket (e.g., a gateway life jacket) for the swarm network. The lead life jacket transmits swarm status data that includes status data for all members of the swarm network, thereby advantageously increasing the efficiency of search and rescue efforts, and also advantageously reducing the amount of power consumed by the non-lead members of the swarm network.

FIG. 1 illustrates a first example environment 100 in which one or more example life jacket(s) can be implemented in accordance with teachings of this disclosure. In the illustrated example of FIG. 1, the first environment 100 includes a first example life jacket 102, a second example life jacket 104, and a third example life jacket 106. The first life jacket 102 is located and/or stowed at a first example seat 108, the second life jacket 104 is located and/or stowed at a second example seat 110, and the third life jacket 106 is located and/or stowed at a third example seat 112. In the illustrated example of FIG. 1, the first environment 100 is located within a fuselage of an aircraft, and each of the first, second and third seats 108, 110, 112 is a seat (e.g., a passenger seat) of the aircraft. In other examples, the first environment 100 can instead be located within a different structure and/or a different type of vehicle having seats. In still other examples, the first environment 100 can instead be an environment that is not located within a vehicle.

As further shown in the illustrated example of FIG. 1, the first environment 100 also includes a device 114 located remotely from each of the first, second and third life jackets 102, 104, 106. In the illustrated example of FIG. 1, the device 114 is a smartphone. In other examples, the device can instead be a tablet, a laptop computer, a desktop computer, a server, another life jacket, a rescue vehicle, a cellular base station, a wireless access point, etc. Each of the first, second and third life jackets 102, 104, 106 of FIG. 1 includes a transceiver or other suitable communication device that is configured to communicate (e.g., wirelessly communicate) with the device 114 for the purpose of providing the device 114 with status data associated with the life jacket. For example, the first life jacket 102 can transmit status data to the device 114 including a unique identifier (e.g., ID No. 1234), an expiration date (e.g., Dec. 31, 2020), an assigned storage location (e.g., Seat No. 11A), and a current location (e.g., at Seat No. 11A) of the first life jacket 102. As another example, the second life jacket 104 can transmit status data to the device 114 including a unique identifier (e.g., ID No. 1235), an expiration date (e.g., Dec. 31, 2020), an assigned storage location (e.g., Seat No. 11B), and a current location (e.g., at Seat No. 11B) of the second life jacket 104. As another example, the third life jacket 106 can transmit status data to the device 114 including a unique identifier (e.g., ID No. 2110), an expiration date (e.g., Jun. 30, 2021), an assigned storage location (e.g., Seat No. 11C), and a current location (e.g., at Seat No. 11C) of the third life jacket 106.

Each of the first, second and third life jackets 102, 104, 106 of FIG. 1 further includes an array and/or collection of sensor(s) and/or processing element(s) that are individually and/or collectively configured to determine whether the life jacket has moved (e.g., relative to its assigned storage location) by more than a threshold amount, whether the life jacket has been installed (e.g., placed on and/or connected to) a user, and/or whether the life jacket has been immersed in water. In some examples, the sensor(s) of each of the first, second and third life jackets 102, 104, 106 include(s) a motion sensor, an accelerometer, an ambient temperature sensor, a buckle sensor, a moisture sensor, a body temperature sensor, a pulse sensor, and/or a respiration sensor. In some examples, the processing element(s) of each of the first, second and third life jackets 102, 104, 106 is/are implemented as one or more processor(s), microprocessor(s), controller(s) and/or microcontroller(s), and can include a jacket health evaluator, a movement evaluator, an installation evaluator, an immersion evaluator, a user health evaluator, and/or a battery evaluator configured to evaluate data sensed, measured and/or detected by, and/or obtained from, the aforementioned sensor(s).

In some examples, the processing element(s) of each of the first, second and third life jackets 102, 104, 106 of FIG. 1 additionally or alternatively include(s) a state manager configured to selectively operate the life jacket in one of multiple operational states of the life jacket including a stowed (e.g., latent) state and one or more of a motion state, an installed state, or a immersed state. In some examples, the processing element(s) of each of the first, second and third life jackets 102, 104, 106 of FIG. 1 additionally or alternatively include(s) a status manager configured to generate status data for the life jacket. In such examples, each of the first, second and third life jackets 102, 104, 106 further includes a radio transmitter to transmit the status data to the device 114, and/or to another device that may or may not be located within the first environment 100 of FIG. 1. In some such examples, the status data includes jacket health data generated by the jacket health evaluator, movement data generated by the movement evaluator, installation data generated by the installation evaluator, immersion data generated by the immersion evaluator, user health data generated by the user health evaluator, battery energy data generated by the battery evaluator, and/or operational state data generated by the state manager of the life jacket.

Figure 2:
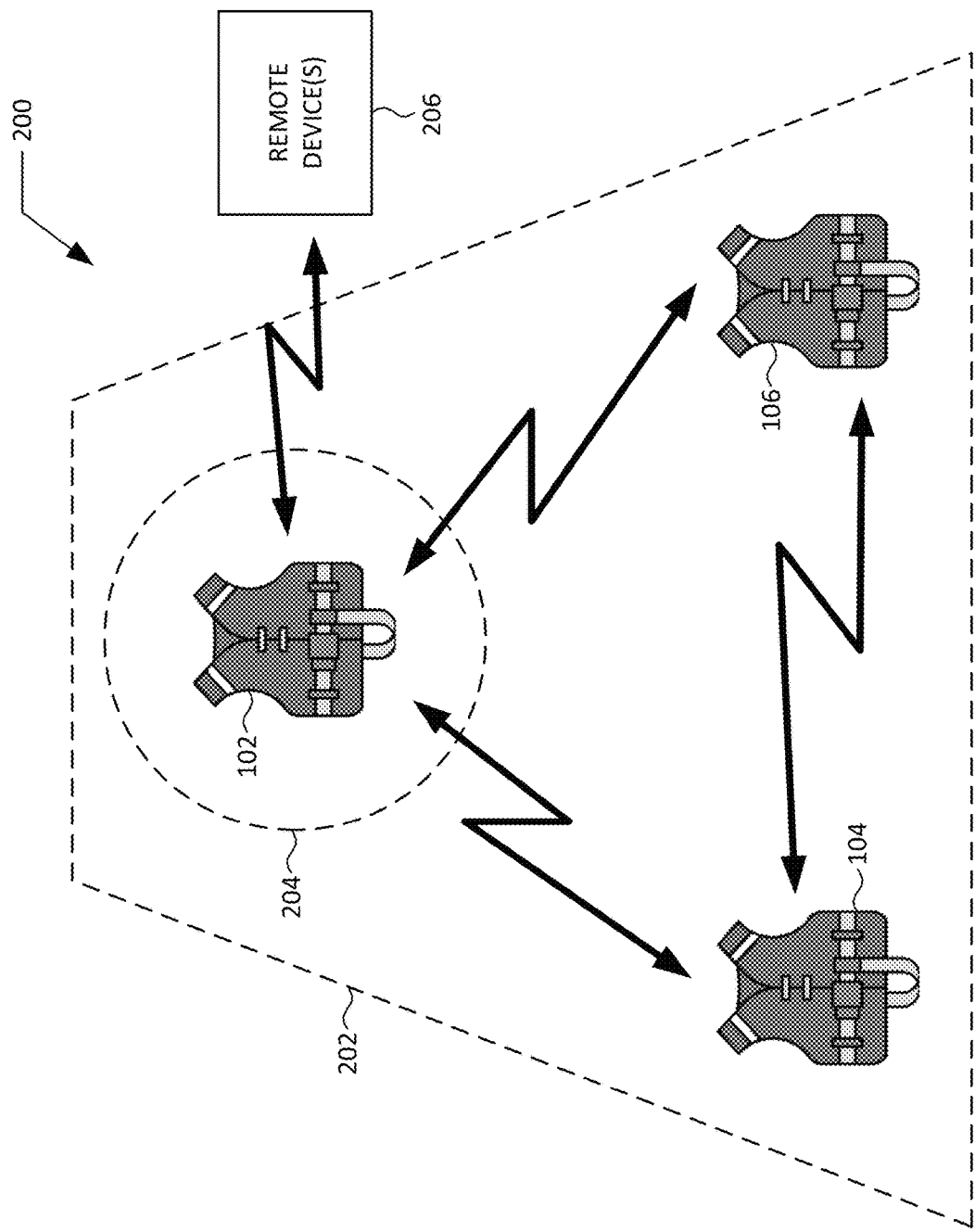
FIG. 2 illustrates a second example environment in which the example life jacket(s) of FIG. 1 can be implemented in accordance with teachings of this disclosure

FIG. 2 illustrates a second example environment 200 in which the example life jacket(s) of FIG. 1 can be implemented in accordance with teachings of this disclosure. The second environment 200 of FIG. 2 includes each of the first, second and third life jackets 102, 104, 106 of FIG. 1 described above, structured and/or configured in the same manner as described above in connection with FIG. 1. In some examples, the processing element(s) of each of the first, second and third life jackets 102, 104, 106 of FIGS. 1 and 2 additionally or alternatively include(s) a swarm manager configured to form a swarm network including two or more of the first, second and third life jackets 102, 104, 106. For example, as shown in FIG. 2, the second environment 200 includes an example swarm network 202 formed by and/or including each of the first, second and third life jackets 102, 104, 106.

In some examples, the swarm manager of each of the first, second and third life jackets 102, 104, 106 is further configured to identify a lead life jacket of the swarm network 202 from among the first, second and third life jackets 102, 104, 106. In the illustrated example of FIG. 2, the first life jacket 102 has been identified as an example lead life jacket 204 of the swarm network 202. In some examples, the lead life jacket 204 transmits swarm status data from the lead life jacket 204 to an example remotely located device 206 (e.g., a rescue vehicle). In such examples, the swarm status data includes status data for the lead life jacket 204 (e.g., the first life jacket 102), as well as for each of the non-lead life jackets (e.g., the second and third life jackets 104, 106) that form the swarm network 202. The formation of the swarm network 202 and/or the transmission of the swarm status data from the lead life jacket 204 of the swarm network advantageously increasing the efficiency of search and rescue efforts, and also advantageously reducing the amount of power consumed by the non-lead life jackets of the swarm network.

Figure 3:
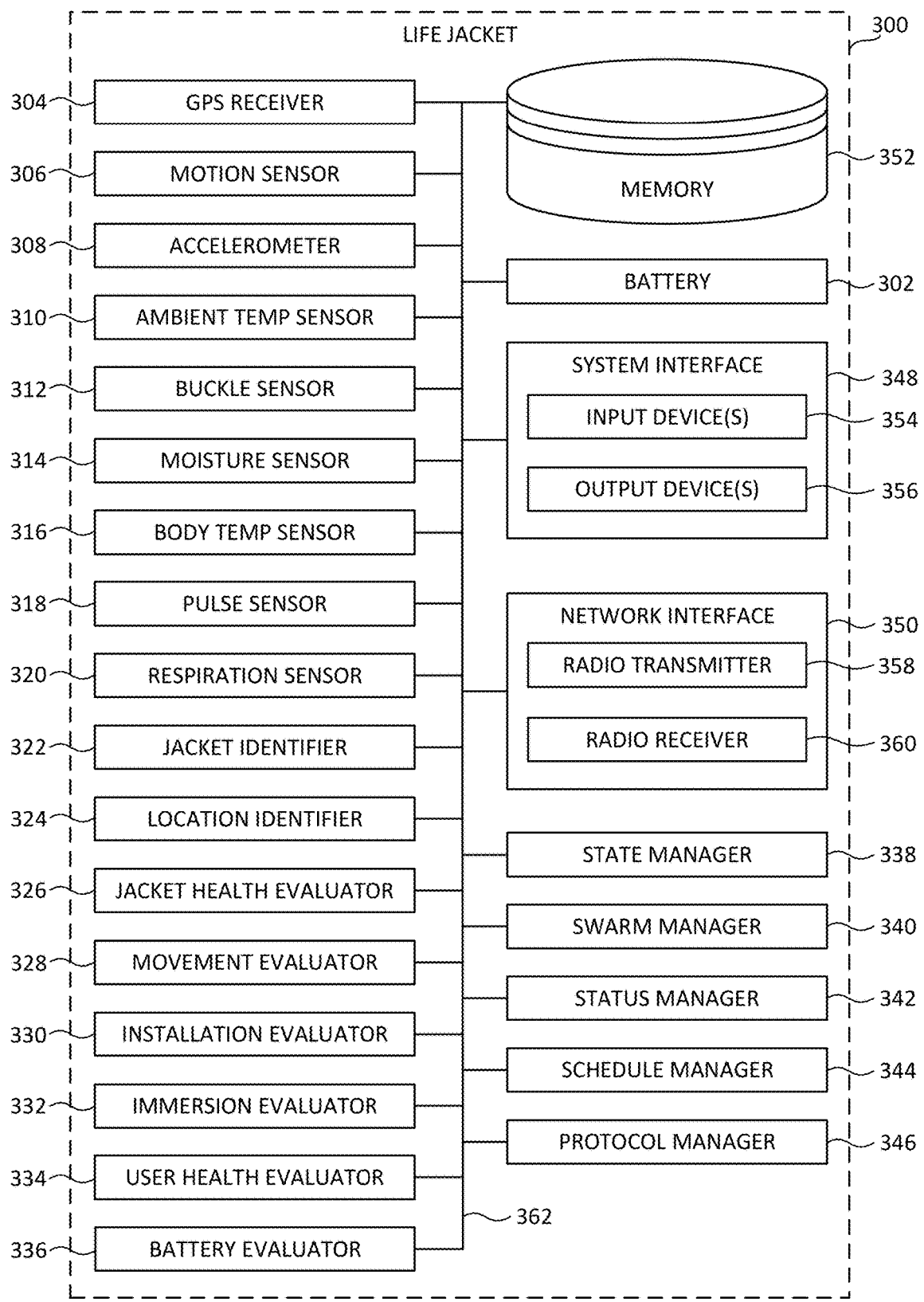
FIG. 3 is a block diagram of an example life jacket constructed in accordance with teachings of this disclosure.

FIG. 3 is a block diagram of an example life jacket 300 constructed in accordance with teachings of this disclosure. The block diagram of FIG. 3 can be used to implement any of the first, second and/or third example life jackets 102, 104, 106 of FIGS. 1 and 2. In the illustrated example of FIG. 3, the life jacket 300 includes an example battery 302, an example GPS receiver 304, an example motion sensor 306, an example accelerometer 308, an example ambient temperature sensor 310, an example buckle sensor 312, an example moisture sensor 314, an example body temperature sensor 316, an example pulse sensor 318, an example respiration sensor 320, an example jacket identifier 322, an example location identifier 324, an example jacket health evaluator 326, an example movement evaluator 328, an example installation evaluator 330, an example immersion evaluator 332, an example user health evaluator 334, an example battery evaluator 336, an example state manager 338, an example swarm manager 340, an example status manager 342, an example schedule manager 344, an example protocol manager 346, an example system interface 348, an example network interface 350, and an example memory 352. The example system interface 348 of FIG. 3 includes one or more example input device(s) 354 and one or more example output device(s) 356. The example network interface 350 of FIG. 3 includes an example radio transmitter 358 and an example radio receiver 360. However, other example implementations of the life jacket 300 of FIG. 3 can include fewer or additional structures.

In the illustrated example of FIG. 3, the battery 302, the GPS receiver 304, the motion sensor 306, the accelerometer 308, the ambient temperature sensor 310, the buckle sensor 312, the moisture sensor 314, the body temperature sensor 316, the pulse sensor 318, the respiration sensor 320, the jacket identifier 322, the location identifier 324, the jacket health evaluator 326, the movement evaluator 328, the installation evaluator 330, the immersion evaluator 332, the user health evaluator 334, the battery evaluator 336, the state manager 338, the swarm manager 340, the status manager 342, the schedule manager 344, the protocol manager 346, the system interface 348 (including the input device(s) 354 and the output device(s) 356), the network interface 350 (including the radio transmitter 358 and the radio receiver 360), and/or the memory 352 are operatively coupled (e.g., in electrical communication) via an example communication bus 362. The jacket identification identifier 322, the location identifier 324, the jacket health evaluator 326, the movement evaluator 328, the installation evaluator 330, the immersion evaluator 332, the user health evaluator 334, the battery evaluator 336, the state manager 338, the swarm manager 340, the status manager 342, the schedule manager 344, and/or the protocol manager 346 of FIG. 3 can individually and/or collectively be implemented by any type(s) and/or any number(s) of semiconductor device(s) (e.g., processor(s), microprocessor(s), controller(s), microcontroller(s), etc.).

The battery 302 of FIG. 3 stores energy. In some examples, the battery 302 provides and/or supplies power to the GPS receiver 304, the motion sensor 306, the accelerometer 308, the ambient temperature sensor 310, the buckle sensor 312, the moisture sensor 314, the body temperature sensor 316, the pulse sensor 318, the respiration sensor 320, the jacket identifier 322, the location identifier 324, the jacket health evaluator 326, the movement evaluator 328, the installation evaluator 330, the immersion evaluator 332, the user health evaluator 334, the battery evaluator 336, the state manager 338, the swarm manager 340, the status manager 342, the schedule manager 344, the protocol manager 346, the system interface 348 (including the input device(s) 354 and the output device(s) 356), the network interface 350 (including the radio transmitter 358 and the radio receiver 360), and/or the memory 352 of the life jacket 300 of FIG. 3. As power is provided by the battery 302, the energy stored by the battery 302 is consumed. In some examples, the battery 302 of FIG. 3 can be implemented as a rechargeable battery that harvests power (e.g., to recharge and/or to maintain a fully-charged state) from a host device to which the battery 302 is removably coupled. For example, the battery 302 can be removably coupled to a powered electrical port of a vehicle seat (e.g., an aircraft seat) at which the life jacket 300 of FIG. 3 is removably stowed. In other examples, the battery 302 can harvest power from vibrations and/or movements of the structure (e.g., a seat), the vehicle (e.g. an aircraft), and/or the user (e.g., a human wearer) to which the life jacket 300 of FIG. 3 is coupled.

The GPS receiver 304 of FIG. 3 collects, acquires and/or receives data and/or one or more signal(s) from one or more GPS satellite(s). Typically, signals from three or more satellites are needed to form the GPS triangulation. The data and/or signal(s) received by the GPS receiver 304 can include information (e.g., time stamps) from which the current position and/or location of the life jacket 300 can be identified and/or derived, including for example, the current latitude, longitude and altitude of the life jacket 300. Location data identified and/or derived from the signal(s) collected and/or received by the GPS receiver 304 can be associated with one or more local time(s) (e.g., time stamped) at which the data and/or signal(s) were collected and/or received by the GPS receiver 304. Location data identified and/or derived from the signal(s) collected and/or received by the GPS receiver 304 can be of any quantity, type, form and/or format, and can be stored in a computer-readable storage medium such as the example memory 352 of FIG. 3 described below.

The motion sensor 306 of FIG. 3 senses, measures and/or detects motion (e.g., movements, changes in position, changes in orientation, etc.) of the life jacket 300 of FIG. 3. For example, the motion sensor 306 can sense, measure and/or detect movement (e.g., removal) of the life jacket 300 from a stowed position (e.g., an assigned seat position). The motion sensor 306 can be implemented by any number (e.g., 1, 2, 3, etc.) of depth sensors, proximity sensors, acoustic sensors, accelerometers, gyroscopes, compasses, and/or other motion-sensing devices. Motion data sensed, measured and/or detected by the motion sensor 306 can be associated with one or more local time(s) (e.g., time stamped) at which the data was collected by the motion sensor 306. Motion data sensed, measured and/or detected by the motion sensor 306 can be of any quantity, type, form and/or format, and can be stored in a computer-readable storage medium such as the example memory 352 of FIG. 3 described below.

The accelerometer 308 of FIG. 3 senses, measures and/or detects changes in velocity (e.g., acceleration(s)) of the life jacket 300 of FIG. 3. Different changes in the velocity values sensed, measured and/or detected by the accelerometer 308 correspond to different accelerations of the life jacket 300. In some examples, the accelerometer 308 of FIG. 3 can be implemented as a triple-axis accelerometer (e.g., a 3-axis accelerometer) such that the accelerometer 308 senses, measures and/or detects acceleration data for each of three axes of a coordinate system associated with the life jacket 300. Acceleration data sensed, measured and/or detected by the accelerometer 308 can be associated with one or more local time(s) (e.g., time stamped) at which the data was collected by the accelerometer 308. Acceleration data sensed, measured and/or detected by the accelerometer 308 can be of any quantity, type, form and/or format, and can be stored in a computer-readable storage medium such as the example memory 352 of FIG. 3 described below.

The ambient temperature sensor 310 of FIG. 3 senses, measures and/or detects the ambient temperature of the life jacket 300 of FIG. 3. For example, the ambient temperature sensor 310 can sense, measure and/or detect the ambient temperature of the life jacket 300 when the life jacket is in a stowed position, and/or when the life jacket is installed on (e.g., worn by) a user. The ambient temperature sensor 310 can be implemented by any number (e.g., 1, 2, 3, etc.) of thermostats, thermistors, thermocouples, and/or other temperature-sensing devices. Ambient temperature data sensed, measured and/or detected by the ambient temperature sensor 310 can be associated with one or more local time(s) (e.g., time stamped) at which the data was collected by the ambient temperature sensor 310. Ambient temperature data sensed, measured and/or detected by the ambient temperature sensor 310 can be of any quantity, type, form and/or format, and can be stored in a computer-readable storage medium such as the example memory 352 of FIG. 3 described below.

The buckle sensor 312 of FIG. 3 senses and/or detects whether the life jacket 300 of FIG. 3 is buckled. The buckle sensor 312 can be implemented by any number (e.g., 1, 2, 3, etc.) of mechanical and/or electrical sensors configured to sense and/or detect the fastening, securing and/or connecting of a latch element (e.g., a clip) of the life jacket 300 to a corresponding buckle element (e.g., a clip receptacle) of the life jacket 300. Buckle connection data sensed, measured and/or detected by the buckle sensor 312 can be associated with one or more local time(s) (e.g., time stamped) at which the data was collected by the buckle sensor 312. Buckle connection data sensed, measured and/or detected by the buckle sensor 312 can be of any quantity, type, form and/or format, and can be stored in a computer-readable storage medium such as the example memory 352 of FIG. 3 described below.

The moisture sensor 314 of FIG. 3 senses, measures and/or detects the extent to which the life jacket 300 of FIG. 3 is exposed to water. The moisture sensor 314 can be implemented by any number (e.g., 1, 2, 3, etc.) of chemical, mechanical and/or electrical sensors configured to sense and/or detect moisture and/or humidity associated with the life jacket 300. Moisture data sensed, measured and/or detected by the moisture sensor 314 can be associated with one or more local time(s) (e.g., time stamped) at which the data was collected by the moisture sensor 314. Moisture data sensed, measured and/or detected by the moisture sensor 314 can be of any quantity, type, form and/or format, and can be stored in a computer-readable storage medium such as the example memory 352 of FIG. 3 described below.

The body temperature sensor 316 of FIG. 3 senses, measures and/or detects the body temperature of a user wearing the life jacket 300 of FIG. 3. The body temperature sensor 316 can be implemented by any number (e.g., 1, 2, 3, etc.) of thermostats, thermistors, thermocouples, and/or other temperature-sensing devices. In some examples, the body temperature sensor 316 of FIG. 3 is a contact-type temperature sensor that is configured to contact one or more body surface(s) of a user when the life jacket 300 of FIG. 3 is worn by the user. Body temperature data sensed, measured and/or detected by the body temperature sensor 316 can be associated with one or more local time(s) (e.g., time stamped) at which the data was collected by the body temperature sensor 316. Body temperature data sensed, measured and/or detected by the body temperature sensor 316 can be of any quantity, type, form and/or format, and can be stored in a computer-readable storage medium such as the example memory 352 of FIG. 3 described below.

The pulse sensor 318 of FIG. 3 senses, measures and/or detects the pulse (e.g., heart rate) of a user wearing the life jacket 300 of FIG. 3. The pulse sensor 318 can be implemented by any number (e.g., 1, 2, 3, etc.) of electrocardiography sensors and/or other pulse-sensing or heart-rate-sensing devices. In some examples, the pulse sensor 318 of FIG. 3 is a contact-type pulse sensor that is configured to contact one or more body surface(s) of a user when the life jacket 300 of FIG. 3 is worn by the user. Pulse data sensed, measured and/or detected by the pulse sensor 318 can be associated with one or more local time(s) (e.g., time stamped) at which the data was collected by the pulse sensor 318. Pulse data sensed, measured and/or detected by the pulse sensor 318 can be of any quantity, type, form and/or format, and can be stored in a computer-readable storage medium such as the example memory 352 of FIG. 3 described below.

The respiration sensor 320 of FIG. 3 senses, measures and/or detects the respiration (e.g., breathing rate) of a user wearing the life jacket 300 of FIG. 3. The respiration sensor 320 can be implemented by any number (e.g., 1, 2, 3, etc.) of spirometer sensors and/or other respiration-sensing or breathing-rate-sensing devices. In some examples, the respiration sensor 320 of FIG. 3 is a contact-type respiration sensor that is configured to contact one or more body surface(s) of a user when the life jacket 300 of FIG. 3 is worn by the user. Respiration data sensed, measured and/or detected by the respiration sensor 320 can be associated with one or more local time(s) (e.g., time stamped) at which the data was collected by the respiration sensor 320. Respiration data sensed, measured and/or detected by the respiration sensor 320 can be of any quantity, type, form and/or format, and can be stored in a computer-readable storage medium such as the example memory 352 of FIG. 3 described below.

The jacket identifier 322 of FIG. 3 identifies and/or determines a unique identifier of the life jacket 300, an assigned storage location (e.g., the intended stowed position) of the life jacket 300, and/or an expiration date of the life jacket 300. For example, the jacket identifier 322 can identify and/or determine a unique identifier (e.g., a serial number) of the life jacket 300 that differentiates the life jacket 300 from other life jackets. As another example, the jacket identifier 322 can additionally or alternatively identify and/or determine an assigned position, location and/or object (e.g., a seat number) at which the life jacket 300 is stowed (or is to be stowed). As another example, the jacket identifier 322 can additionally or alternatively identify and/or determine an expiration date (e.g., an expressly-defined expiration date, or an expiration date established based on an expressly-defined date of manufacture) of the life jacket 300.

In some examples, the jacket identifier 322 of FIG. 3 can identify and/or determine the unique identifier, the assigned storage location, and/or the expiration date of the life jacket 300 by accessing and/or obtaining the unique identifier, the assigned storage location, and/or the expiration date from the memory 352 of the life jacket 300. In other examples, the jacket identifier 322 can additionally or alternatively identify and/or determine the unique identifier, the assigned storage location, and/or the expiration date of the life jacket 300 based on one or more input(s) received via the input device(s) 354 of the system interface 348 of FIG. 3, and/or based on one or more communication(s) received via the radio receiver 360 of the network interface 350 of FIG. 3.

The location identifier 324 of FIG. 3 identifies and/or determines the location (e.g., the current location) of the life jacket 300 of FIG. 3. For example, the location identifier 324 of FIG. 3 can identify and/or determine the location of the life jacket 300 of FIG. 3 by deriving the current location from the data and/or signal(s) received by the GPS receiver 304 of FIG. 3. In some examples, the location of the life jacket 300 identified and/or determined by the location identifier 324 includes the current latitude, the current longitude, and/or the current altitude of the life jacket 300. Location data identified, determined and/or processed by and/or at the location identifier 324 can be of any quantity, type, form and/or format, and can be stored in a computer-readable storage medium such as the example memory 352 of FIG. 3 described below.

The jacket health evaluator 326 of FIG. 3 evaluates and/or monitors the health (e.g., the remaining lifespan) of the life jacket 300 of FIG. 3. For example, the jacket health evaluator 326 can evaluate and/or monitor the health of the life jacket 300 based on the expiration date identified and/or determined by the jacket identifier 322 of FIG. 3. In some examples, the jacket health evaluator 326 compares the expiration date identified and/or determined by the jacket identifier 322 to a current (e.g., actual) date identified and/or determined by the jacket health evaluator 326. In some such examples, the jacket health evaluator 326 generates jacket health data (e.g., one or more jacket health notification(s)) based on the result and/or outcome of the aforementioned comparison.

For example, the jacket health evaluator 326 can generate first jacket health data (e.g., indicating that the life jacket 300 is in good health and/or has not expired) in response to the jacket health evaluator 326 determining that the expiration date associated with the life jacket 300 extends beyond the current date. As another example, the jacket health evaluator 326 can additionally or alternatively generate second jacket health data (e.g., indicating that the life jacket 300 is in poor health and/or has expired) in response to the jacket health evaluator 326 determining that the expiration date associated with the life jacket 300 does not extend beyond the current date. Jacket health evaluation data and/or jacket health data evaluated, generated and/or processed by and/or at the jacket health evaluator 326 can be of any quantity, type, form and/or format, and can be stored in a computer-readable storage medium such as the example memory 352 of FIG. 3 described below.

The movement evaluator 328 of FIG. 3 evaluates and/or monitors movement (e.g., changes in position, changes in orientation, changes in velocity, etc.) of the life jacket 300 of FIG. 3. For example, the movement evaluator 328 can evaluate and/or monitor movement of the life jacket 300 based on the motion data sensed, measured and/or detected by the motion sensor 306 of FIG. 3, and/or based on the acceleration data sensed, measured and/or detected by the accelerometer 308 of FIG. 3. In some examples, the movement evaluator 328 compares the motion data to a motion threshold, and/or compares the acceleration data to an acceleration threshold. In some such examples, the movement evaluator 328 generates movement data (e.g., one or more movement notification(s)) based on the result(s) and/or outcome(s) of the aforementioned comparison(s).

For example, the movement evaluator 328 can generate first movement data (e.g., indicating that the life jacket 300 has not moved by more than a threshold amount) in response to the movement evaluator 328 determining that the motion data is below the motion threshold, and/or that the acceleration data is below the acceleration threshold. As another example, the movement evaluator 328 can additionally or alternatively generate second movement data (e.g., indicating that the life jacket 300 has moved by more than a threshold amount) in response to the movement evaluator 328 determining that the motion data is equal to or above the motion threshold, and/or that the acceleration data is equal to or above the acceleration threshold.

In some examples, the movement evaluator 328 can evaluate and/or monitor movements of the life jacket 300 relative to the assigned storage location of the life jacket 300 identified and/or determined by the jacket identifier 322. In other examples, the movement evaluator 328 can additionally and/or alternatively evaluate and/or monitor movements of the life jacket 300 relative to one or more location(s) of one or more other life jacket(s). Movement evaluation data and/or movement data evaluated, generated and/or processed by and/or at the movement evaluator 328 can be of any quantity, type, form and/or format, and can be stored in a computer-readable storage medium such as the example memory 352 of FIG. 3 described below.

The installation evaluator 330 of FIG. 3 evaluates and/or monitors the installation status of the life jacket 300 of FIG. 3. For example, the installation evaluator 330 can evaluate and/or monitor the installation status of the life jacket 300 based on the ambient temperature data sensed, measured and/or detected by the ambient temperature sensor 310 of FIG. 3, and/or based on the buckle connection data sensed, measured and/or detected by the buckle sensor 312 of FIG. 3. In some examples, the installation evaluator 330 compares the ambient temperature data to an ambient temperature threshold, and/or determines whether the buckle connection data is indicative of a first (e.g., unbuckled) state or a second (e.g., buckled) state. In some such examples, the installation evaluator 330 generates installation data (e.g., one or more installation notification(s)) based on the result(s) and/or outcome(s) of the aforementioned comparison and/or determination.

For example, the installation evaluator 330 can generate first installation data (e.g., indicating that the life jacket 300 has not been installed on the body of a user) in response to the installation evaluator 330 determining that the ambient temperature data is below the ambient temperature threshold, and/or that the buckle connection data indicates an unbuckled state. As another example, the installation evaluator 330 can additionally or alternatively generate second installation data (e.g., indicating that the life jacket 300 has been installed on the body of a user) in response to the installation evaluator 330 determining that the ambient temperature data is equal to or above the ambient temperature threshold, and/or that the buckle connection data indicates a buckled state. Installation evaluation data and/or installation data evaluated, generated and/or processed by and/or at the installation evaluator 330 can be of any quantity, type, form and/or format, and can be stored in a computer-readable storage medium such as the example memory 352 of FIG. 3 described below.

The immersion evaluator 332 of FIG. 3 evaluates and/or monitors the immersion status of the life jacket 300 of FIG. 3. For example, the immersion evaluator 332 can evaluate and/or monitor the immersion status of the life jacket 300 (e.g., whether or not the life jacket 300 has been immersed in water) based on the moisture data sensed, measured and/or detected by the moisture sensor 314 of FIG. 3. In some examples, the immersion evaluator 332 determines whether the moisture data is indicative of a first (e.g., non-immersed and/or dry) state or a second (e.g., immersed and/or wet) state. In some such examples, the immersion evaluator 332 generates immersion data (e.g., one or more immersion notification(s)) based on the result and/or outcome of the aforementioned determination.

For example, the immersion evaluator 332 can generate first immersion data (e.g., indicating that the life jacket 300 has not been immersed in water) in response to the immersion evaluator 332 determining that the moisture data indicates a non-immersed (e.g., dry) state. As another example, the immersion evaluator 332 can additionally or alternatively generate second immersion data (e.g., indicating that the life jacket 300 has been immersed in water) in response to the immersion evaluator 332 determining that the moisture data indicates an immersed (e.g., wet) state. Immersion evaluation data and/or immersion data evaluated, generated and/or processed by and/or at the immersion evaluator 332 can be of any quantity, type, form and/or format, and can be stored in a computer-readable storage medium such as the example memory 352 of FIG. 3 described below.

The user health evaluator 334 of FIG. 3 evaluates and/or monitors the health of a user wearing the life jacket 300 of FIG. 3. For example, the user health evaluator 334 can evaluate and/or monitor the health of a user wearing the life jacket 300 based on the body temperature data sensed, measured and/or detected by the body temperature sensor 316 of FIG. 3, based on the pulse data sensed, measured and/or detected by the pulse sensor 318 of FIG. 3, and/or based on the respiration data sensed, measured and/or detected by the respiration sensor 320 of FIG. 3. In some examples, the user health evaluator 334 compares the body temperature data to a body temperature threshold, compares the pulse data to a pulse threshold, and/or compares the respiration data to a respiration threshold. In some such examples, the user health evaluator 334 generates user health data (e.g., one or more user health notification(s)) based on the result(s) and/or outcome(s) of the aforementioned comparison(s).

For example, the user health evaluator 334 can generate first user health data (e.g., indicating that the user of the life jacket 300 is in good health) in response to the user health evaluator 334 determining that the body temperature data is above the body temperature threshold, that the pulse data is above the pulse threshold, and/or that the respiration data is above the respiration threshold. As another example, the user health evaluator 334 can additionally or alternatively generate second user health data (e.g., indicating that the user of the life jacket 300 is in poor health) in response to the user health evaluator 334 determining that the body temperature data is equal to or below the body temperature threshold, that the pulse data is equal to or below the pulse threshold, and/or that the respiration data is equal to or below the respiration threshold. User health evaluation data and/or user health data evaluated, generated and/or processed by and/or at the user health evaluator 334 can be of any quantity, type, form and/or format, and can be stored in a computer-readable storage medium such as the example memory 352 of FIG. 3 described below.

The battery evaluator 336 of FIG. 3 evaluates and/or monitors the remaining energy (e.g., based on a current state of charge) of the battery 302 of FIG. 3. In some examples, the battery evaluator 336 compares the remaining energy of the battery 302 to an energy threshold. In some such examples, the battery evaluator 336 generates battery energy data (e.g., one or more battery energy notification(s)) based on the result and/or outcome of the aforementioned comparison.

For example, the battery evaluator 336 can generate first battery energy data (e.g., indicating that the battery 302 of the life jacket 300 has sufficient remaining energy) in response to the battery evaluator 336 determining that the remaining energy of the battery 302 is above the energy threshold. As another example, the battery evaluator 336 can generate second battery energy data (e.g., indicating that the battery 302 of the life jacket 300 does not have sufficient remaining energy) in response to the battery evaluator 336 determining that the remaining energy of the battery 302 is equal to or below the energy threshold. Battery energy evaluation data and/or battery energy data evaluated, generated and/or processed by and/or at the battery evaluator 336 can be of any quantity, type, form and/or format, and can be stored in a computer-readable storage medium such as the example memory 352 of FIG. 3 described below.

The state manager 338 of FIG. 3 manages and/or controls one or more operational state(s) of the life jacket 300 of FIG. 3. For example, the state manager 338 can selectively operate the life jacket 300 in one of a stowed (e.g., latent) state, a motion state, an installed states, or an immersed state. In some such examples, the state manager 338 of FIG. 3 operates the life jacket 300 in the stowed state while the life jacket 300 is located at its assigned storage location, and/or prior to the movement evaluator 328 of FIG. 3 determining that the life jacket 300 has moved by more than a threshold amount. The state manager 338 additionally or alternatively operates the life jacket 300 in the motion state in response to the movement evaluator 328 of FIG. 3 determining that the life jacket 300 has moved by more than a threshold amount, and/or prior to the installation evaluator 330 of FIG. 3 determining that the life jacket 300 has been installed on the body of a user. The state manager 338 additionally or alternatively operates the life jacket 300 in the installed state in response to the installation evaluator 330 of FIG. 3 determining that the life jacket 300 has been installed on the body of a user, and/or prior to the immersion evaluator 332 of FIG. 3 determining that the life jacket 300 has been immersed in water. The state manager 338 additionally or alternatively operates the life jacket 300 in the immersed state in response to the immersion evaluator 332 of FIG. 3 determining that the life jacket 300 has been immersed in water.

In some examples, the state manager 338 of FIG. 3 enables and/or activates specific sensors and/or processing units of the life jacket 300 of FIG. 3 based on and/or in response to the operational state of the life jacket 300. For example, the state manager 338 can enable and/or activate the GPS receiver 304, the motion sensor 306, the accelerometer 308, the jacket identifier 322, the location identifier 324, the jacket health evaluator 326, the movement evaluator 328, and/or the battery evaluator 336 of FIG. 3 based on and/or in response to the life jacket 300 being in the stowed (e.g., latent) state. As another example, the state manager 338 can additionally enable and/or activate the ambient temperature sensor 310, the buckle sensor 312, and/or the installation evaluator 330 of FIG. 3 based on and/or in response to the life jacket 300 being in the motion state. As another example, the state manager 338 can additionally enable and/or activate the moisture sensor 314 and/or the immersion evaluator 332 of FIG. 3 based on and/or in response to the life jacket 300 being in the installed state. As another example, the state manager 338 can additionally enable and/or activate the body temperature sensor 316, the pulse sensor 318, the respiration sensor 320, and/or the user health evaluator 334 of FIG. 3 based on and/or in response to the life jacket 300 being in the immersed state.

In some examples, the state manager 338 of FIG. 3 disables and/or deactivates specific sensors and/or processing units of the life jacket 300 of FIG. 3 based on and/or in response to the operational state of the life jacket 300. For example, the state manager 338 can disable and/or deactivate the ambient temperature sensor 310, the buckle sensor 312, the moisture sensor 314, the body temperature sensor 316, the pulse sensor 318, the respiration sensor 320, the installation evaluator 330, the immersion evaluator 332, and/or the user health evaluator 334 of FIG. 3 based on and/or in response to the life jacket 300 being in the stowed (e.g., latent) state. As another example, the state manager 338 can disable and/or deactivate the moisture sensor 314, the body temperature sensor 316, the pulse sensor 318, the respiration sensor 320, the immersion evaluator 332, and/or the user health evaluator 334 of FIG. 3 based on and/or in response to the life jacket 300 being in the motion state. As another example, the state manager 338 can disable and/or deactivate the body temperature sensor 316, the pulse sensor 318, the respiration sensor 320, and/or the user health evaluator 334 of FIG. 3 based on and/or in response to the life jacket 300 being in the installed state.

In some examples, the state manager 338 of FIG. 3 generates operational state data (e.g., one or more operational state notification(s)) based on the operational state(s) of the life jacket 300 of FIG. 3. For example, the state manager 338 can generate first operational state data (e.g., indicating that the life jacket 300 is operating in the stowed state) in response to the state manager 338 operating the life jacket 300 in the stowed state. As another example, the state manager 338 can generate second operational state data (e.g., indicating that the life jacket 300 is operating in the motion state) in response to the state manager 338 operating the life jacket 300 in the motion state. As another example, the state manager 338 can generate third operational state data (e.g., indicating that the life jacket 300 is operating in the installed state) in response to the state manager 338 operating the life jacket 300 in the installed state. As another example, the state manager 338 can generate fourth operational state data (e.g., indicating that the life jacket 300 is operating in the immersed state) in response to the state manager 338 operating the life jacket 300 in the immersed state. Operational state management data and/or operational state data managed, generated and/or processed by and/or at the state manager 338 can be of any quantity, type, form and/or format, and can be stored in a computer-readable storage medium such as the example memory 352 of FIG. 3 described below.

Figure 4:
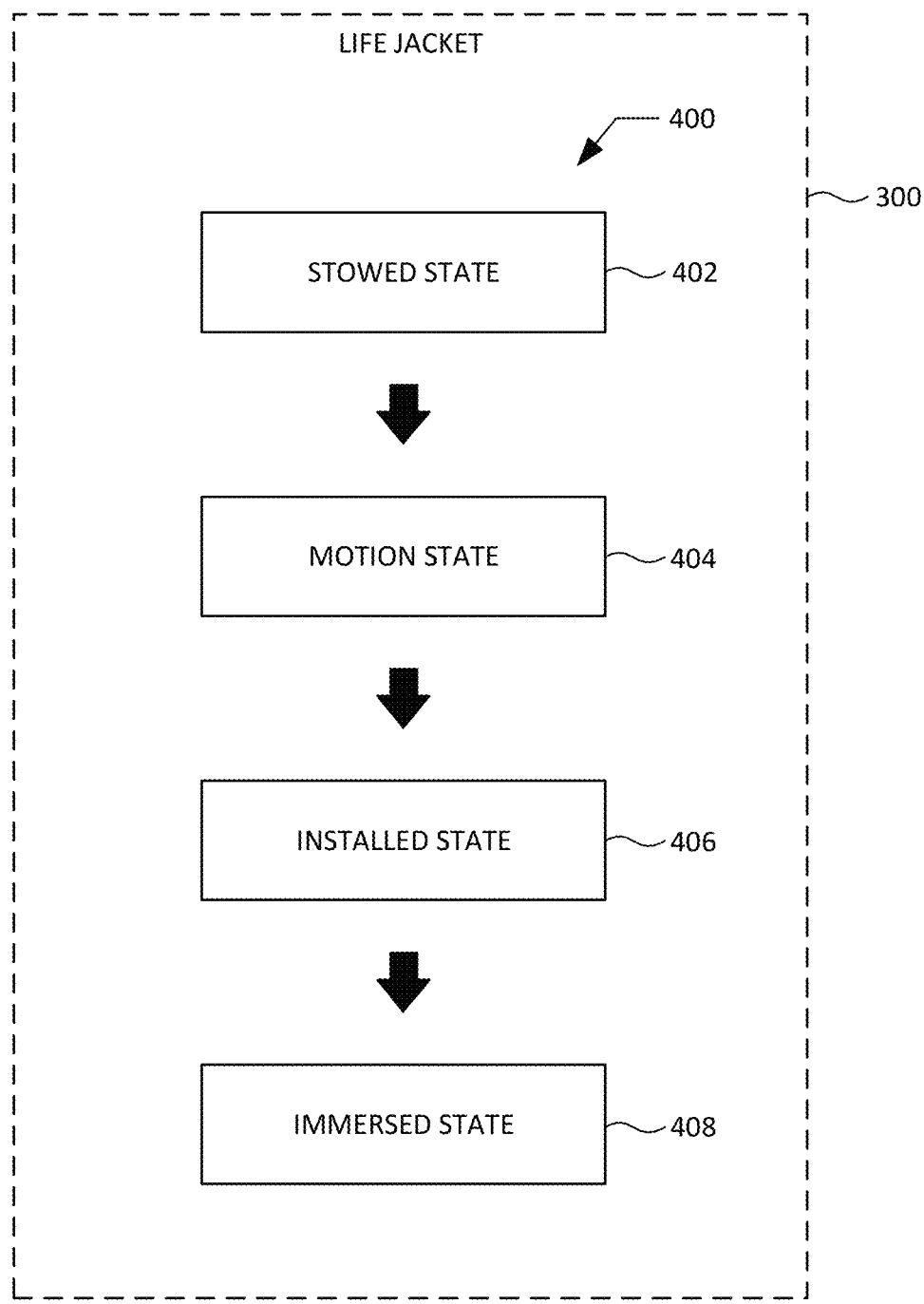
FIG. 4 illustrates an example state diagram that can be implemented by the example state manager of the example life jacket of FIG. 3.

FIG. 4 illustrates an example state diagram 400 that can be implemented by the example state manager 338 of the example life jacket 300 of FIG. 3. As shown in FIG. 4, the life jacket 300 is selectively operable in one of an example stowed (e.g., latent) state 402, an example motion state 404, an example installed state 406, and an example immersed state. In the illustrated example of FIG. 4, the state diagram 400 implemented by the state manager 338 enables the life jacket 300 to transition from the stowed state 402 to the motion state 404, from the motion state 404 to the installed state 406, and from the installed state 406 to the immersed state 408. In other examples, the state manager 338 can additionally or alternatively implement a state diagram that enables the life jacket 300 to transition from the stowed state 402 directly to the installed state 406, from the stowed state 402 directly to the immersed state 408, and/or from the motion state 404 directly to the immersed state 408.

In some examples, the state manager 338 of FIG. 3 causes the life jacket 300 to transition between different states of the state diagram 400 of FIG. 4 in response to determinations made by, and/or data generated by, one or more of the movement evaluator 328, the installation evaluator 330, and/or the immersion evaluator 332 of FIG. 3. For example, the state manager 338 can cause the life jacket 300 to transition from the stowed state 402 to the motion state 404 in response to the movement evaluator 328 determining that the life jacket 300 has moved more than a threshold amount. As another example, the state manager 338 can cause the life jacket 300 to transition from the motion state 404 to the installation state 406 in response to the installation evaluator 330 determining that the life jacket 300 has been installed on a user. As another example, the state manager 338 can cause the life jacket 300 to transition from the installed state 406 to the immersed state 408 in response to the immersion evaluator 332 determining that the life jacket 300 has been immersed in water.

Returning to the illustrated example of FIG. 3, the swarm manager 340 of FIG. 3 manages and/or controls the formation and/or maintenance of a swarm network that includes the life jacket 300 of FIG. 3 and one or more other life jacket(s). The swarm manager 340 can generate and/or form a swarm network between and/or among the life jacket 300 of FIG. 3 and one or more other life jacket(s) at any time, and/or while the life jacket 300 of FIG. 3 is configured in any state. For example, the swarm manager 340 can generate and/or form a swarm network while the life jacket 300 is in a stowed (e.g., latent) state. As another example, the swarm manager 340 can generate and/or form a swarm network while the life jacket 300 is in a motion state, and/or in response to the life jacket 300 transitioning from a stowed state to a motion state. As another example, the swarm manager 340 can generate and/or form a swarm network while the life jacket 300 is in an installed state, and/or in response to the life jacket 300 transitioning from a motion state to an installed state. As another example, the swarm manager 340 can generate and/or form a swarm network while the life jacket 300 is in an immersed state, and/or in response to the life jacket 300 transitioning from an installed state to an immersed state.

In some examples, a swarm network generated and/or formed by the swarm manager 340 of FIG. 3 can include a group of life jackets that are located on a vehicle (e.g., on an aircraft) and are within a spatially-proximate distance from one another. For example, the swarm manager 340 can generate and/or form a swarm network that includes all life jackets located at ten consecutive rows of seating of an aircraft (e.g., all life jackets located at seating rows one through ten). In some such examples, the life jackets to be included in the swarm network are defined and/or determined by one or more swarm size, swarm shape, swarm pattern and/or swarm configuration policies implemented and/or applied by the swarm manager 340. In other examples, a swarm network generated and/or formed by the swarm manager 340 of FIG. 3 can include a group of life jackets that are randomly located on a vehicle (e.g., on an aircraft). For example, the swarm manager 340 can generate and/or form a swarm network that includes a first life jacket located at a first row of seating of an aircraft, a second life jacket located at a third row of seating of the aircraft, and a third life jacket located at a twentieth row of seating of an aircraft. In some such examples, the life jackets to be included in the swarm network are randomly determined by the swarm manager 340.

Each life jacket of a swarm network generated and/or formed by the swarm manager 340 of FIG. 3 is structured and/or configured in a manner that enables the life jacket to transmit and/or receive communications (e.g., radio signals and/or data) to and/or from at least one of the other life jacket(s) of the swarm network. For example, the life jacket 300 of FIG. 3 includes a radio transmitter 358 to facilitate the transmission of radio communications from the life jacket 300 to one or more other life jacket(s) of a swarm network, and a radio receiver 360 to facilitate the receiving of radio communications at the life jacket 300 from one or more other life jacket(s) of a swarm network. In some examples, each life jacket of the swarm network is structured and/or configured in a manner that is substantially similar to the life jacket 300 of FIG. 3.

In connection with and/or in response to generating and/or forming a swarm network, the swarm manager 340 of FIG. 3 identifies and/or determines a lead life jacket (e.g., a gateway life jacket) from among the life jackets included in the swarm network. In some examples, the swarm manager 340 can identify the life jacket 300 of FIG. 3 as the lead life jacket of the swarm network. In other examples, the swarm manager 340 can alternatively identify one of the other life jacket(s) of the swarm network as the lead life jacket of the swarm network. In some examples, the identification and/or designation of a lead life jacket facilitates a reduction in the amount and/or the extent of battery energy to be consumed by the other (e.g., non-lead) life jackets of the swarm network.

The swarm manager 340 of FIG. 3 can identify and/or determine the lead life jacket of a swarm network using one or more evaluation and/or selection technique(s). For example, the swarm manager 340 can identify and/or determine the lead life jacket of the swarm network as the life jacket from among the multiple life jackets of the swarm network that demonstrates the greatest signal strength for radio communications from the radio transmitter 358 and/or to the radio receiver 360. As another example, the swarm manager 340 can additionally or alternatively identify the lead life jacket of the swarm network as the life jacket from among the multiple life jackets of the swarm network that demonstrates the greatest remaining battery energy. As yet another example, the swarm manager 340 can alternatively randomly identify and/or determine the lead life jacket of the swarm network. Furthermore, the swarm manager 340 of FIG. 3 can identify and/or determine multiple (e.g., different) life jackets of the swarm network as the lead life jacket during the lifespan of the swarm network. For example, in response to a designated lead life jacket of the swarm network being compromised (e.g., due to destruction, loss of battery energy, loss of signal communication, etc.), the swarm manager 340 of FIG. 3 identifies and/or determines a new lead life jacket of the swarm network. In some such examples, the swarm manager 340 is configured to seamlessly identify and/or determine the new lead life jacket without loss and/or destruction of the existing swarm network.

The lead life jacket (e.g., the life jacket 300 of FIG. 3) of a swam network (e.g., a swarm network generated and/or formed by the swarm manager 340 of FIG. 3) receives and/or collects status data (e.g., information, signals, notifications and/or reports indicating the status of a life jacket) from the other (e.g., non-lead) life jackets of the swarm network, and transmits swarm status data (e.g., information, signals, notifications and/or reports indicating the status of multiple life jackets of a swarm network) to one or more other device(s) (e.g., a rescue vehicle, a cellular base station, a wireless access point, etc.). Thus, the lead life jacket of the swarm network functions and/or operates as a gateway life jacket that transmits swarm status data representing and/or indicating the status of the swarm network as a whole (e.g., inclusive of all members of the swarm network), as opposed to transmitting status data representing and/or indicating the status of only the lead life jacket. Swarm management data and/or swarm status data generated and/or processed by and/or at the swarm manager 340 can be of any quantity, type, form and/or format, and can be stored in a computer-readable storage medium such as the example memory 352 of FIG. 3 described below.

Figure 5A:
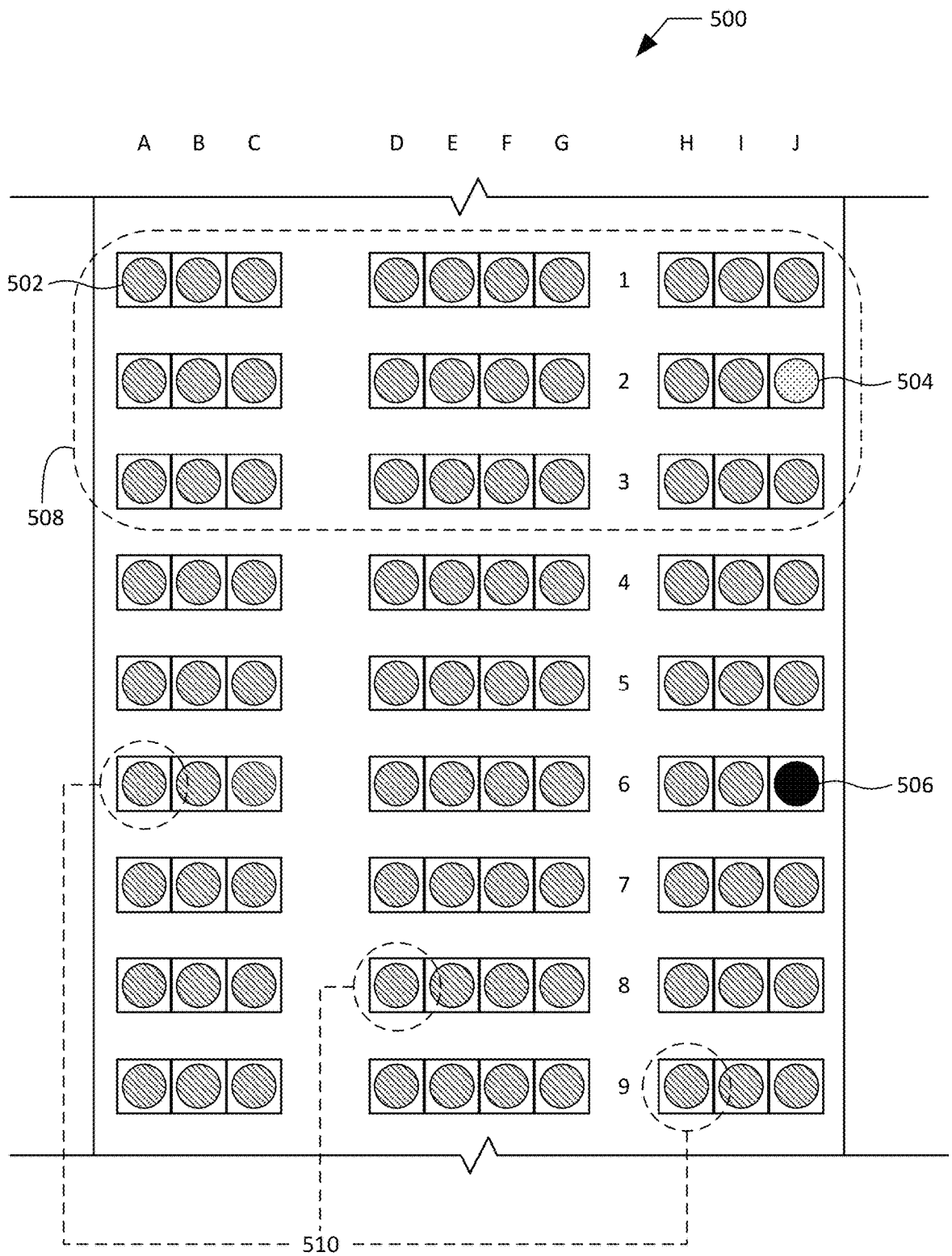
FIG. 5A illustrates an example aircraft fuselage section including example life jackets from which one or more example swarm networks can be formed.

FIG. 5A illustrates an example aircraft fuselage section 500 including example life jackets from which one or more example swarm networks can be formed. In the illustrated example of FIG. 5A, the aircraft fuselage section 500 includes seats organized in rows 1-9 and columns A-J, with each seat including a life jacket located and/or stowed one or under the seat. In some examples, the jacket health evaluator 326 of FIG. 3 determines that a first example life jacket 502 located at seat 1A is not expired, and/or that a second example life jacket 506 located at seat 2J is expired. In some examples, the battery evaluator 336 of FIG. 3 determines that a third example life jacket 506 located at seat 6J has remaining battery energy that is below a battery energy threshold.

As further illustrated in FIG. 5A, multiple swarm networks can be formed by different life jackets commonly located within the aircraft fuselage section 500. For example, a first example swarm network 508 formed within the aircraft fuselage section 500 includes a total of thirty life jackets located at neighboring seats in rows 1-3 and columns A-J of the aircraft fuselage section 500, while a second example swarm network 510 formed within the aircraft fuselage section 500 includes a total of three life jackets located at seats 6A, 8D and 9H of the aircraft fuselage section 500.

Figure 5B:
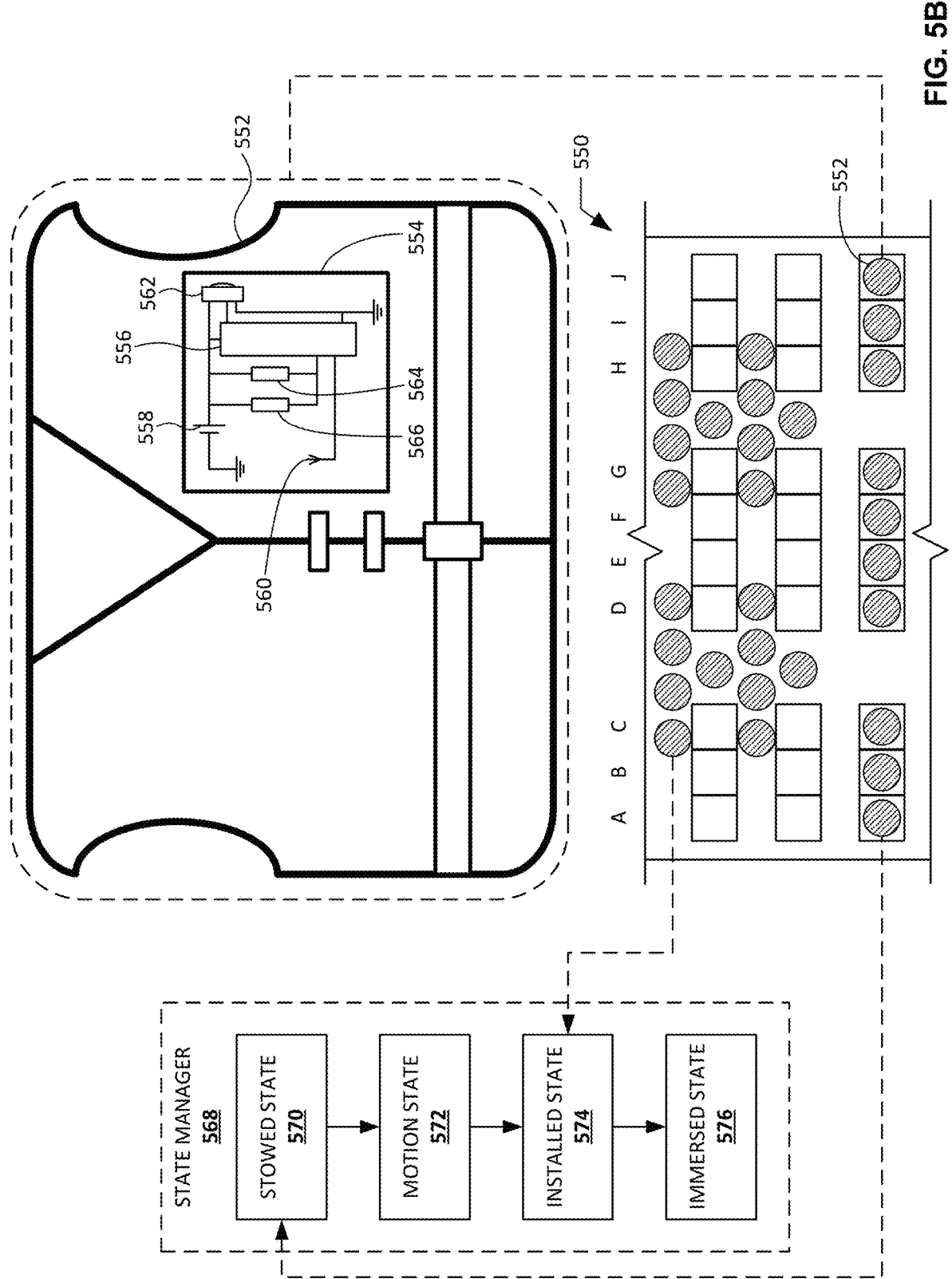
FIG. 5B illustrates another example aircraft fuselage section including example life jackets.

FIG. 5B illustrates another example aircraft fuselage section 550 including example life jackets 552. As illustrated in FIG. 5B, stowed under each seat is a life jacket 552 that is similar to the first, second and third life jackets 102, 104 and 106 of FIG. 1, and/or the life jacket 300 of FIG. 3 described above. Each life jacket 552 has a life jacket controller 554, which includes a processor 556 (or processing elements) that is coupled to a battery 558 and to a radio transmitter 560 (or a transceiver), as illustrated in the schematic diagram in FIG. 5B. The processor 556 includes a program or instructions which when executed cause the processor 556 to intermittently check a sensed battery voltage or energy level relative to a battery voltage or energy threshold. Alternatively, a battery evaluator (e.g., the battery evaluator 336 of FIG. 3) checks the battery energy level. The processor 556 responsively generates a status signal that is transmitted by the radio transmitter 560, which includes information indicating the unique identifier of the life jacket 552, the assigned storage location or seat location of the life jacket 552, a stowed state (or latent state) status, and information indicating that the battery voltage or energy level is either acceptable or below the battery voltage or energy level threshold, where the signal information is received by a receiver/transceiver of a device in the aircraft cabin (such as device 114 of FIG. 1). In an exemplary embodiment, the processor 556 is a microprocessor that is operable in a low-power usage sleep-mode in which the processor 556 controls or limits the supply of current from battery 558 to only the processor 556 and a timer function for periodically waking the processor 556, which then intermittently checks the battery voltage or energy level and responsively transmits a signal with battery level information, to thereby reduce battery power consumption and prolong the usable life of the battery 558. In the stowed or latent state, the status of each life jacket 552 and its battery 558 may be displayed by a device within the aircraft cabin viewable by aircraft crew, to notify crew of any life jacket 552 that is expired or that needs replacement of a battery 558.

As illustrated in FIG. 5B, each life jacket 552 stowed under a seat has a processor 556 coupled to the battery 558 and to a motion sensor 562 configured to detect motion of the life jacket 552. In the event of an aircraft water landing, each passenger or crew member preparing to evacuate may remove the life jacket 552 stowed under their seat. The life jacket 552 is positioned against the lower side of the seat and includes a motion sensor 562 that senses motion, such as motion of the life jacket 552 relative to the seat during removal of the life jacket 552 from beneath the seat, for example. In one exemplary embodiment, the motion sensor 562 is an infrared sensor positioned to face the lower side of the seat such that the seat covers the motion sensor 562 and the motion sensor 562 cannot detect motion. The motion sensor 562 could not detect motion by a person for example, until the life jacket 552 is removed from the seat and the motion sensor 562 detects motion of a person through black-body radiation in contrast to background objects. The motion sensor 562 may include other suitable sensors that are configured to detect movement such as motion when the life jacket 552 is removed from the seat. Upon sensing movement after removal of the life jacket 552 from beneath the seat, the motion sensor 562 communicates sensed motion to the processor 556. In one exemplary embodiment, the motion sensor 562 communicates a signal to an enable input of the processor 556, for waking the processor 556 from a sleep mode and switching the processor 556 to full power operation for applying power to multiple sensors to be monitored, and to the radio transmitter 560 (or transceiver for receiving signals). In response to communication of sensed motion by the motion sensor 562, the processor 556 is configured to communicate sensed motion information to the radio transmitter 560 (or transceiver), which is configured to wirelessly communicate sensed motion information associated with the life jacket 552, such that the communicated information is received by a life jacket controller 554 of one or more other life jackets 552 that are within wireless signal range.

Preferably, one or more (e.g., all) of the life jackets 552 has/have a controller 554 that further includes an accelerometer in communication with the processor 556. The processor 556 may detect sensed motion of the life jacket 552 based on the acceleration data sensed by the accelerometer that exceeds a threshold, or based on analysis of accelerometer data wirelessly communicated by other life jackets. In response to detected or sensed motion of the life jacket 552 by the accelerometer, the processor 556 is configured to communicate accelerometer data to the radio transmitter 560 (or transceiver), which is configured to wirelessly communicate accelerometer and/or motion data associated with the life jacket 552, such that the communicated information is received by a life jacket controller 554 of one or more other life jackets 552 that are within wireless signal range.

In an exemplary embodiment, the processor 556 includes instructions which when executed cause the processor 556 to implement a state manager 568, where in response to detected or sensed motion of the life jacket 552, the processor 556 and state manager 568 are configured to transition from the stowed state 570 (in which the processor 556 performs limited monitoring and wireless communication to minimize battery power consumption) to the motion state 572. During the motion state 572, the processor 556 is configured to communicate information including sensed motion from the motion sensor 562 to the radio transmitter 560 (or transceiver), which is configured to wirelessly communicate signals including sensed motion information associated with the life jacket 552, such that the communicated information is received by a life jacket controller 554 of one or more life jackets 552 that are within wireless signal range, such as life jackets 552 depicted in FIG. 5B that are being removed from beneath seats by passengers who move into the aisles to evacuate. In an exemplary embodiment, the life jacket controller 554 further includes a temperature sensor 564 configured to detect a temperature proximate the life jacket 552, which initially may be an ambient temperature of the surrounding environment. When a user puts on the life jacket 552, the temperature sensor 564 of the life jacket 552 being worn detects an increase in sensed temperature from a prior sensed ambient temperature, which is indicative that the life jacket 552 is being in worn by a user. The processor 556 in communication with the temperature sensor 564 is configured to detect a temperature increase, or a sensed temperature that is above or below a threshold temperature, which is indicative of the life jacket 552 being worn by a user. Optionally, the life jacket controller 554 may further include an ambient temperature sensor, where the processor 556 is configured to compare the sensed temperature information sensed by the temperature sensor 564 with the sensed ambient temperature, to determine if a temperature difference is indicative of the life jacket 552 being worn by a user. In response to detecting a temperature increase or temperature threshold indicative of the life jacket being worn by a user, the processor 556 and state manager 568 implemented by the processor 556 are configured to transition operation to the worn state or installed state 574.

In an exemplary embodiment, the processor 556 and state manager 568 implemented by the processor 556 are configured to transition from the motion state 572 to the worn state or installed state 574, in response to a temperature increase or temperature threshold indicative of the life jacket 552 being worn by a user. In the worn state or installed state 574, the processor 556 is configured to monitor the sensed temperature sensed by the temperature sensor 564, which is an indicator that the user is in good health. During the worn state or installed state 574, the processor 556 is configured to communicate sensed temperature information to the radio transmitter 560 (or transceiver), which is configured to wirelessly communicate signals including sensed temperature information associated with the life jacket 552 being worn by a user and the user's health, such that the communicated information is received by a life jacket controller 554 of one or more life jackets 552 that are within wireless signal range. It should be noted that the wireless communications by the life jacket controllers for one or more life jackets may communicate via one of a Bluetooth® interface, a near field communication (NFC) interface, a Wi-Fi communication network, a Bluetooth communication network, a cellular network, a Zigbee network, or other suitable wireless communication protocols.

In an exemplary embodiment, the processor 556 and state manager 568 implemented by the processor 556 that are configured to transition from the stowed state 570 and the motion state 572 are further configured to operate in the worn state or installed state 574, and to cause the processor 556 to periodically communicate status information to be transmitted by the radio transmitter 560 (or transceiver). The processor 556 directs the radio transmitter 560 (or transceiver) to transmit wireless signals including information indicating the unique identifier of the life jacket 552, the assigned storage location or seat location of the life jacket 552, a worn state (or installed state) status, and information indicating the sensed temperature associated with the life jacket 552 being worn and the user's health, where the signal information is received by a receiver/transceiver of a life jacket controller 554 of one or more life jackets 552 that are within wireless signal range. The transmitting life jacket controller 554 communicates wireless signal information that is received by one or more other life jackets, such as those life jackets being worn by passengers in the aisles preparing to evacuate as depicted in FIG. 5B. Where the transmitting life jacket controller 554 communicates wireless signal information that is received by one or more other life jackets 552, the transmitted wireless signal sent by the transmitting life jacket controller 554 may prompt a request for a "lead life jacket" acknowledgement response communication from the one or more other life jacket controllers, for purposes of establishing a communication network between a number of life jacket controllers that are within wireless communication range of each other. In one exemplary embodiment, if a particular life jacket controller 554 in the worn state 574 is the first to transmit wireless signal information received by one or more other life jacket controllers, upon receipt by the particular life jacket controller 554 of an acknowledgement response communication from one or more other life jacket controllers, the particular first transmitting life jacket controller 554 is established as the lead life jacket that controls the formation and/or maintenance of a swarm network that includes the one or more other life jacket controllers. The processor 556 of the one or more life jacket controllers may execute instructions that cause the processor 556 to operate a swarm manager application, for example, for implementing the above process for requesting a "lead life jacket" acknowledgement response communication and establishing a particular life jacket controller 554 as a lead life jacket. The other life jacket controllers forming the swarm network continue to respond to and communicate their status information the lead life jacket controller 554. As life jacket controllers of other life jackets 552 that transition to the worn state 574 receive wireless communication signals transmitted by the lead life jacket (which signals include information identifying the transmitting life jacket controller 554 as the lead life jacket), other life jacket controllers are joined in the swarm network of one or more life jacket controllers and life jackets 552. If for any reason the life jacket controller 554 of the lead life jacket fails to transmit (within a predetermined time from the last transmission) a subsequent signal that identifies the transmitting life jacket controller as the lead life jacket, another one of the life jacket controllers is configured to transmit wireless signal information to prompt a request for a "lead life jacket" acknowledgement response communication, for of establishing a new lead life jacket within the communication network between the life jacket controllers within wireless communication range of each other. In this manner, a swarm network may be formed by the one or more life jacket controllers of one or more life jackets 552 being worn by users, such as those life jackets 552 depicted in FIG. 5B that are being worn by passengers in the aisles preparing to evacuate.

In an exemplary embodiment, where the users or passengers in the aisles depicted in FIG. 5B evacuate the aircraft and may enter a body of water, the one or more life jackets 552 further include a moisture sensor 566 that senses and/or detects the extent to which the life jacket 552 is exposed to water. The moisture sensor 566 is in communication with the processor 556 of the life jacket controller 554, where the processor 556 is configured to determine that the user or wearer of the life jacket 552 is in water based on the sensed moisture detected by the moisture sensor 566. Where the processor 556 determines that the user or wearer of the life jacket 552 is in water based on the sensed moisture, the processor 556 and state manager 568 implemented by the processor 556 are configured to transition from the worn state or installed state 574 to the immersed state 576.

In an exemplary embodiment, the processor 556 and state manager 568 implemented by the processor 556 are configured to transition from the worn state or installed state 574 to the immersed state 576, in which the life jacket controller 554 is further configured to operate in the immersed state 576 and cause the processor 556 to periodically communicate status information to the radio transmitter 560 (or transceiver) for transmission of signals with status information. The lead life jacket controller 554 preferably establishes and/or communicates transmit schedule or timing for the one or more other life jacket controllers to transmit status data. As other life jacket controllers transition from the worn state 574 to the immersed state 576 when other users of life jackets enter the water, the other life jacket controllers continue to receive wireless communication signals transmitted by the lead life jacket (which signals include information identifying the transmitting life jacket controller as the current lead life jacket). The one or more other life jacket controllers in the immersed state 576 transmit status information to the lead life jacket controller 554, which information includes the unique identifier of the life jacket 552, the assigned storage location or seat location of the life jacket 552, an immersion state status, and information indicating the sensed temperature associated with the life jacket 552 being worn and the user's health. The lead life jacket controller 554 also transmits information pertaining to the swarm status data for the one or more life jackets in the immersion state 576 to one or more other device(s) (e.g., a rescue vehicle, a cellular base station, a wireless access point, etc.). The lead life jacket controller 554 also transmits to rescue crew information pertaining to the swarm status data for the one or more life jackets 552 in the immersion state 576, which information includes for each life jacket 552 in the swarm, the unique identifier of the life jacket 552, the assigned storage location or seat location of the life jacket 552, an immersion state status, and information indicating the sensed temperature associated with the life jacket 552 being worn and the user's health. In one exemplary embodiment, one or more of the life jackets or life jacket controllers preferably include a GPS receiver that receives location information, which includes the current latitude, longitude and altitude of the life jacket 552. The lead life jacket controller 554 preferably further includes a GPS receiver, and the processor 556 of the life jacket controller 554 is configured to receive the location information received from the GPS receiver. The lead life jacket controller 554 is configured to include the location information for the one or more life jackets in the transmission of swarm status information to one or more devices of a rescue vehicle or crew. The designated lead life jacket, or another life jacket controller that assumes the role of the lead life jacket, are configured to continue communicating swarm status information from the one or more other life jacket controllers to one or more other device(s) (e.g., a rescue vehicle, a cellular base station, a wireless access point, etc.) to facilitate prompt rescue of the users of the life jackets, where rescue may be prioritized based on their health status.

Figure 6:
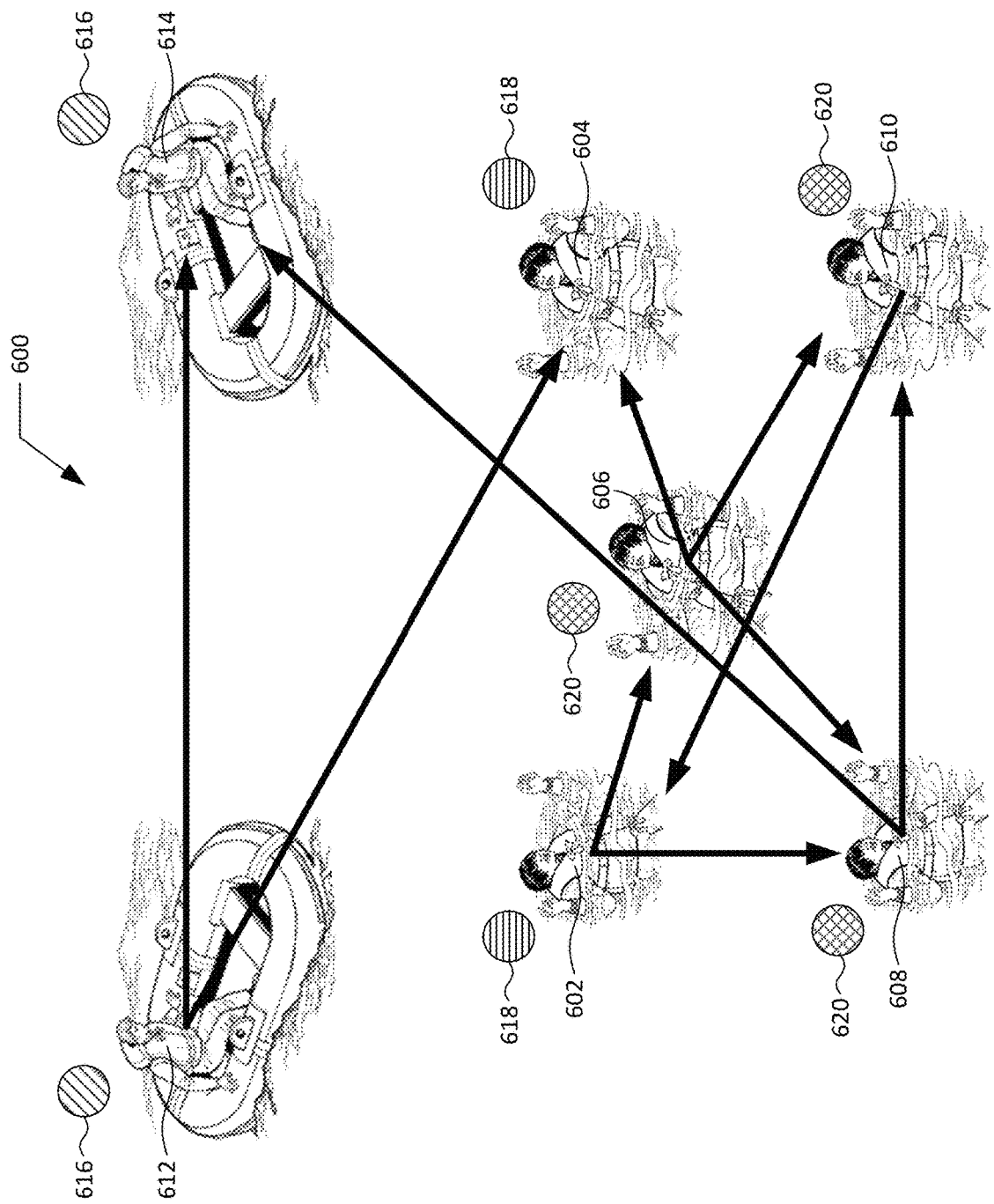
FIG. 6 illustrates an example swarm network operating in an environment in which several example life jackets of the swarm network are immersed in water.

FIG. 6 illustrates an example swarm network 600 operating in an environment in which several example life jackets of the swarm network 600 are immersed in water. In the illustrated example of FIG. 6, the swarm network 600 includes a first example life jacket 602, a second example life jacket 604, a third example life jacket 606, a fourth example life jacket 608, a fifth example life jacket 610, a sixth example life jacket 612, and a seventh example life jacket 614. The first, second, third, fourth and fifth life jackets 602, 604, 606, 608, 610 of the swarm network 600 are immersed in water. The sixth and seventh life jackets 612, 614 of the swarm network 600 are not immersed in water, and are instead located aboard floatation vehicles (e.g., rafts).

In the illustrated example of FIG. 6, respective user health evaluators (e.g., implemented as the user health evaluator 334 of FIG. 3) of the sixth and seventh life jackets 612, 614 have determined that the respective users of the sixth and seventh life jackets 612, 614 are in good health, as indicated by the first example triage markers 616 of FIG. 6. Respective user health evaluators (e.g., implemented as the user health evaluator 334 of FIG. 3) of the first and second life jackets 602, 604 have determined that the respective users of the first and second life jackets 602, 604 are in fair health (e.g., less than good health, but better than poor health), as indicated by the second example triage markers 618 of FIG. 6. Respective user health evaluators (e.g., implemented as the user health evaluator 334 of FIG. 3) of the third, fourth and fifth life jackets 606, 608 and 610 have determined that the respective users of the third, fourth and fifth life jackets 606, 608 and 610 are in poor health, as indicated by the third example triage markers 620 of FIG. 6.

As further shown in the illustrated example of FIG. 6, the first life jacket 602 of FIG. 6 transmits communications to the third and fourth life jackets 606, 608, and receives communications from the fifth life jacket 610. The second life jacket 604 of FIG. 6 receives communications from the third and sixth life jackets 606, 612. The third life jacket 606 of FIG. 6 transmits communications to the second, fourth and fifth life jackets 604, 608, 610, and receives communication from the first life jacket 602. The fourth life jacket 608 of FIG. 6 transmits communications to the fifth and seventh life jackets 610, 614, and receives communications from the first and third life jackets 602, 606. The fifth life jacket 610 of FIG. 6 transmits communications to the first life jacket 602, and receives communications from the third and fourth life jackets 606, 608. The sixth life jacket 612 of FIG. 6 transmits communications to the second and seventh life jackets 604, 614. The seventh life jacket 614 of FIG. 6 receives communications from the fourth and sixth life jackets 608, 612.

Figure 7:
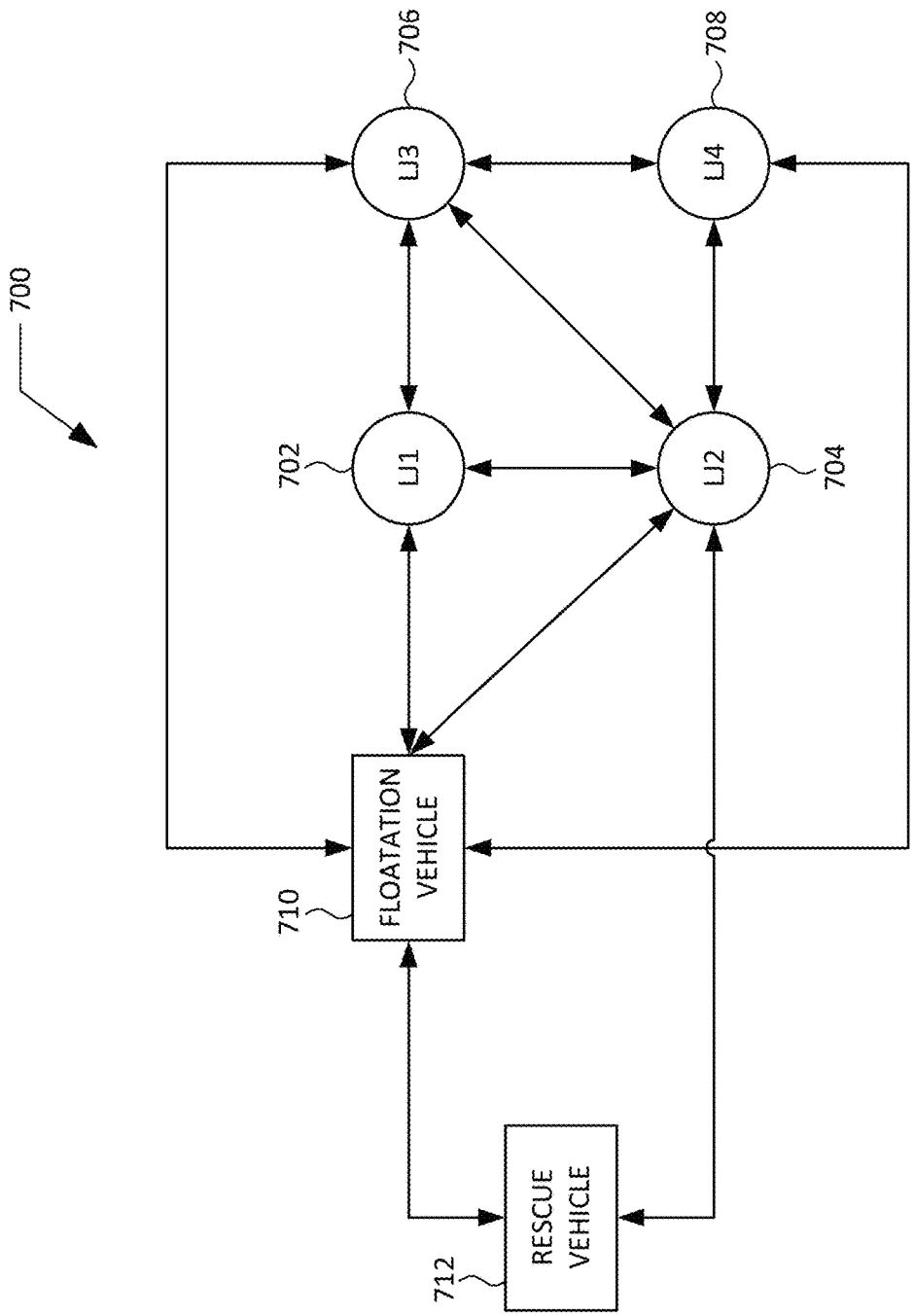
FIG. 7 illustrates a first example swarm network communication diagram.

FIG. 7 illustrates a first example swarm network communication diagram 700. The first swarm network communication diagram 700 of FIG. 7 facilitates, enables, and/or governs communications between a first example life jacket 702, a second example life jacket 704, a third example life jacket 706, a fourth example life jacket 708, an example floatation vehicle 710 (e.g., a raft), and an example rescue vehicle 712 (e.g., a rescue boat, a rescue helicopter, etc.). In the illustrated example of FIG. 7, the first life jacket 702 of FIG. 7 communicates with the second and third life jackets 704, 706, and with the floatation vehicle 710. The second life jacket 704 of FIG. 7 communicates with the first, third and fourth life jackets 702, 706, 708, with the floatation vehicle 710, and with the rescue vehicle 712. The third life jacket 706 of FIG. 7 communicates with the first, second and fourth life jackets 702, 704, 708, and with the floatation vehicle 710. The fourth life jacket 708 of FIG. 7 communicates with the second and third life jackets 704, 706, and with the floatation vehicle 710. The floatation vehicle 710 of FIG. 7 communicates with the first, second, third and fourth life jackets 702, 704, 706, 708, and with the rescue vehicle 712. The rescue vehicle 712 of FIG. 7 communicates with the second life jacket 704, and with the floatation vehicle 710.

Figure 8:
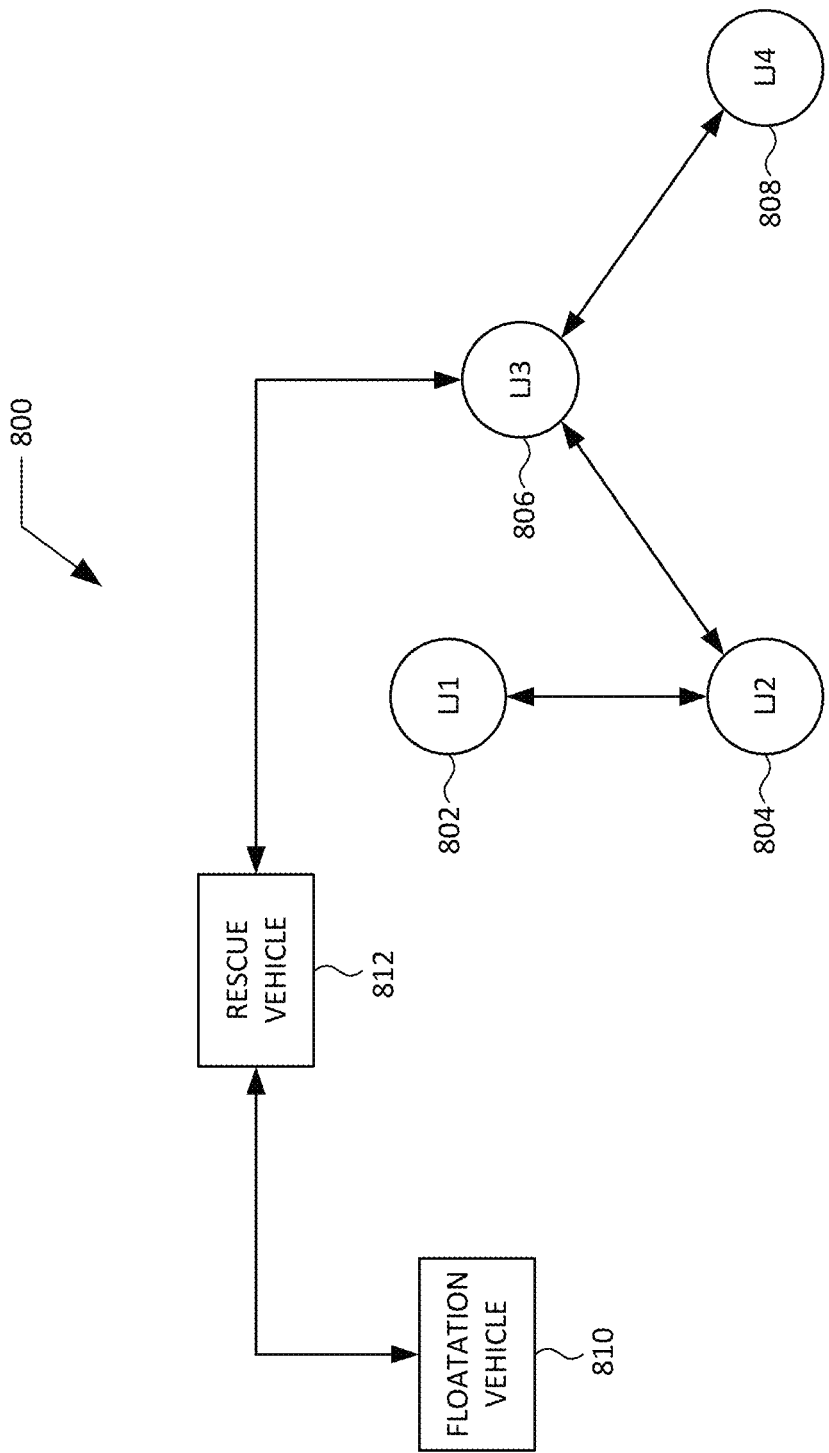
FIG. 8 illustrates a second example swarm network communication diagram.

FIG. 8 illustrates a second example swarm network communication diagram 800. The second swarm network communication diagram 800 of FIG. 8 facilitates, enables, and/or governs communications between a first example life jacket 802, a second example life jacket 804, a third example life jacket 806, a fourth example life jacket 808, an example floatation vehicle 810 (e.g., a raft), and an example rescue vehicle 812 (e.g., a rescue boat, a rescue helicopter, etc.). In the illustrated example of FIG. 8, the first life jacket 802 of FIG. 8 communicates with the second life jackets 804. The second life jacket 804 of FIG. 8 communicates with the first and third life jackets 802, 806. The third life jacket 806 of FIG. 8 communicates with the second and fourth life jackets 804, 808, and with the rescue vehicle 812. The fourth life jacket 808 of FIG. 8 communicates with the third life jackets 806. The floatation vehicle 810 of FIG. 8 communicates with the rescue vehicle 812. The rescue vehicle 812 of FIG. 8 communicates with the third life jacket 806, and with the floatation vehicle 810.

Returning to the illustrated example of FIG. 3, the status manager 342 of FIG. 3 manages and/or controls the generation of status data (e.g., information, signals, notifications and/or reports indicating the status of a life jacket) for the life jacket 300 of FIG. 3. For example, the status manager 342 of FIG. 3 can generate status data based on and/or including a unique identifier of the life jacket 300, an assigned storage location of the life jacket 300, and/or an expiration date of the life jacket 300 determined by the jacket identifier 322 of FIG. 3, a location of the life jacket 300 determined by the location identifier 324 of FIG. 3, jacket health data generated by the jacket health evaluator 326 of FIG. 3, movement data generated by the movement evaluator 328 of FIG. 3, installation data generated by the installation evaluator 330 of FIG. 3, immersion data generated by the immersion evaluator 332 of FIG. 3, user health data generated by the user health evaluator 334 of FIG. 3, battery energy data generated by the battery evaluator 336 of FIG. 3, and/or operational state data generated by the state manager 338 of FIG. 3. In some such examples (e.g., when a swarm network has been generated and/or formed by the swarm manager 340 of FIG. 3, as described above), the status data generated by the status manager 342 can be swarm status data (e.g., information, signals, notifications and/or reports indicating the status of multiple life jackets of a swarm network) that, in addition to the above-described information and/or data associated with the life jacket 300, also includes corresponding information and/or data for one or more other life jacket(s) (e.g., one or more other life jacket(s) that, along with the life jacket 300 of FIG. 3, form the swarm network).

In some examples, the status manager 342 of FIG. 3 generates the above-described status data based on the state of the life jacket 300 as managed and/or determined by the state manager 338. For example, when the life jacket is in a stowed (e.g. latent) state, the status data generated by the status manager 342 can include a unique identifier of the life jacket 300, an assigned storage location of the life jacket 300, and/or an expiration date of the life jacket 300 determined by the jacket identifier 322 of FIG. 3, a location of the life jacket 300 determined by the location identifier 324 of FIG. 3, jacket health data generated by the jacket health evaluator 326 of FIG. 3, movement data generated by the movement evaluator 328 of FIG. 3, and/or operational state data generated by the state manager 338 of FIG. 3. As another example, when the life jacket is in the motion state, the status data generated by the status manager 342 can further include installation data generated by the installation evaluator 330 of FIG. 3. As another example, when the life jacket is in the installed state, the status data generated by the status manager 342 can further include immersion data generated by the immersion evaluator 332 of FIG. 3. As another example, when the life jacket is in the immersed state, the status data generated by the status manager 342 can further include user health data generated by the battery evaluator 336 of FIG. 3.

Furthermore, the status manager 342 of FIG. 3 can generate the above-described status data at multiple (e.g., different) predefined intervals (e.g., sampling periods) based on the current state of the life jacket 300, as managed and/or determined by the state manager 338 of FIG. 3. For example, the status manager 342 can generate the status data according to a first predefined interval when the life jacket 300 is in a stowed (e.g., latent) state, according to s second predefined interval (e.g., different from the first predefined interval) when the life jacket 300 is in a motion state, according to a third predefined interval (e.g., different from each of the first and second predefined intervals) when the life jacket 300 is in an installed state, and according to a fourth predefined interval (e.g., different from each of the first, second and third predefined intervals) when the life jacket 300 is in an immersed state. Status management data and/or status data generated and/or processed by and/or at the status manager 342 can be of any quantity, type, form and/or format, and can be stored in a computer-readable storage medium such as the example memory 352 of FIG. 3 described below.

The schedule manager 344 of FIG. 3 manages and/or controls a schedule (e.g., an order, a sequence, respective times, etc.) by which status data is to be transmitted from the life jacket 300 of FIG. 3. For example, the schedule manager 344 can establish and/or apply a schedule for transmitting status data from the life jacket 300 to one or more other device(s) e.g., a smartphone, a tablet, a laptop computer, a desktop computer, a server, another life jacket, a rescue vehicle, a cellular base station, a wireless access point, etc.). As another example, in instances where the life jacket 300 of FIG. 3 has been designated as a lead life jacket of a swarm network generated and/or formed by the swarm manager 340 of FIG. 3, the schedule manager 344 can establish and/or apply a schedule for transmitting swarm status data from the life jacket 300 (e.g., the lead life jacket) to one or more other device(s) (e.g., a rescue vehicle, a cellular base station, a wireless access point, etc.).

The schedule manager 344 of FIG. 3 can establish and/or determine a schedule for transmitting status data using one or more evaluation and/or selection technique(s). For example, the schedule manger 344 can establish and/or determine the schedule based on the available bandwidth of the network with which the network interface 350 of FIG. 3 is associated, and/or based on the network communication protocol determined by the protocol manger 346 of FIG. 3. As another example, the schedule manger 344 can additionally or alternatively establish and/or determine the schedule based on the remaining battery energy of the battery 302 of the life jacket 300. As yet another example, the schedule manger 344 can alternatively randomly establish and/or determine the schedule.

Furthermore, the schedule manager 344 of FIG. 3 can establish, determine and/or apply determine multiple (e.g., different) schedules based on the current state of the life jacket 300, as determined by the state manager 338 of FIG. 3. For example, the schedule manager 344 can establish, determine and/or apply a first schedule when the life jacket 300 is in a stowed (e.g., latent) state, a second schedule (e.g., different from the first schedule) when the life jacket 300 is in a motion state, a third schedule (e.g., different from each of the first and second schedules) when the life jacket 300 is in an installed state, and a fourth schedule (e.g., different from each of the first, second and third schedules) when the life jacket 300 is in an immersed state. Schedule management data and/or schedules managed, generated and/or processed by and/or at the schedule manager 344 can be of any quantity, type, form and/or format, and can be stored in a computer-readable storage medium such as the example memory 352 of FIG. 3 described below.

The protocol manager 346 of FIG. 3 controls, manages and/or determines a network communication protocol to be implemented by the radio transmitter 358 and/or the radio receiver 360 of FIG. 3, and/or, more generally, to be implemented by the network interface 350 of FIG. 3 to enable the life jacket 300 of FIG. 3 to operate and/or communicate with one or more other device(s) (e.g., a smartphone, a tablet, a laptop computer, a desktop computer, a server, another life jacket, a rescue vehicle, a cellular base station, a wireless access point, etc.). In some examples, the network interface 350 of FIG. 3 can be configured to enable the life jacket 300 of FIG. 3 to implement only one type of network communication protocol (e.g., a single candidate protocol) to operate and/or communicate with the other device(s). For example, the network interface 350 of FIG. 3 can be configured to enable the life jacket 300 of FIG. 3 to implement only a Wi-Fi communication protocol to operate and/or communicate with the other device(s). In such examples, the protocol manager 346 of FIG. 3 identifies and/or determines the single candidate protocol as the network communication protocol to be implemented by the radio transmitter 358 and/or the radio receiver 360 of FIG. 3, and/or, more generally, to be implemented by the network interface 350 of FIG. 3.

In other examples, the network interface 350 of FIG. 3 can be configured to enable the life jacket 300 of FIG. 3 to implement more than one type of network communication protocol (e.g., multiple candidate protocols) to operate and/or communicate with the other device(s). For example, the network interface 350 of FIG. 3 can be configured to enable the life jacket 300 of FIG. 3 to implement any of a cellular communication protocol, a Wi-Fi communication protocol, a Bluetooth communication protocol, a Zigbee communication protocol, etc. to operate and/or communicate with the other device(s). In such examples, the protocol manager 346 of FIG. 3 identifies and/or determines a selected one of the multiple candidate protocols as the network communication protocol to be implemented by the radio transmitter 358 and/or the radio receiver 360 of FIG. 3, and/or, more generally, to be implemented by the network interface 350 of FIG. 3. In some such examples, the protocol manager 346 identifies and/or determines the network communication protocol as the protocol from among the multiple candidate protocols that enables the greatest signal strength for communications from the radio transmitter 358 and/or to the radio receiver 360. Network communication protocol data managed, determined and/or processed by and/or at the protocol manager 346 can be of any quantity, type, form and/or format, and can be stored in a computer-readable storage medium such as the example memory 352 of FIG. 3 described below.

The system interface 348 of FIG. 3 facilitates interactions and/or communications between a user and the life jacket 300 of FIG. 3. The system interface 348 includes one or more input device(s) 354 via which the user can input information and/or data to the life jacket 300. For example, the input device(s) 354 can include a button, a switch, and/or a microphone that enable(s) the user to convey data and/or commands to the jacket identifier 322, the state manager 338, the swarm manager 340, the status manager 342, the protocol manager 346, the network interface 350, and/or the memory 352 of FIG. 3, and/or, more generally, to the life jacket 300 of FIG. 3. The system interface 348 of FIG. 3 also includes one or more output device(s) 356 via which the system interface 348 presents information and/or data in visual, audible, and/or tactile form to the user. For example, the output device(s) 356 can include a light emitting diode and/or a liquid crystal display for presenting visual information, a speaker for presenting audible information, and/or a haptic device for presenting tactile information. Data and/or information that is presented and/or received via the system interface 348 can be of any quantity, type, form and/or format, and can be stored in a computer-readable storage medium such as the example memory 352 of FIG. 3 described below.

The network interface 350 of FIG. 3 enables and/or facilitates one or more network-based communication(s) (e.g., cellular communication(s), Wi-Fi communication(s), Bluetooth communication(s), Zigbee communication(s), etc.) between the life jacket 300 of FIG. 3 and one or more other device(s) (e.g., a smartphone, a tablet, a laptop computer, a desktop computer, a server, another life jacket, a rescue vehicle, a cellular base station, a wireless access point, etc.). As mentioned above, the network interface 346 of FIG. 3 includes the radio transmitter 358 and the radio receiver 360 of FIG. 3, each of which is further described below.

The radio transmitter 358 of FIG. 3 transmits data and/or one or more radio frequency signal(s) to one or more other device(s) (e.g., a smartphone, a tablet, a laptop computer, a desktop computer, a server, another life jacket, a rescue vehicle, a cellular base station, a wireless access point, etc.). In some examples, the data and/or signal(s) transmitted by the radio transmitter 358 is/are communicated over a network (e.g., a cellular network, a Wi-Fi network, a Bluetooth network, a Zigbee network, etc.) utilizing a network communication protocol determined by the protocol manager 346 of FIG. 3. In some examples, the radio transmitter 358 transmits data and/or one or more radio frequency signal(s) based on status data and/or swarm status data generated by and/or at the status manager 342 of FIG. 3. In some examples, the radio transmitter 358 transmits data and/or one or more radio frequency signal(s) according to a schedule determined by the schedule manager 344 of FIG. 3. Data corresponding to the signal(s) to be transmitted by the radio transmitter 358 can be of any type, form and/or format, and can be stored in a computer-readable storage medium such as the example memory 352 of FIG. 3 described below.

The radio receiver 360 of FIG. 3 collects, acquires and/or receives data and/or one or more radio frequency signal(s) from one or more other device(s) (e.g., a smartphone, a tablet, a laptop computer, a desktop computer, a server, another life jacket, a rescue vehicle, a cellular base station, a wireless access point, etc.). In some examples, the data and/or signal(s) received by the radio receiver 360 is/are communicated over a network (e.g., a cellular network, a Wi-Fi network, a Bluetooth network, a Zigbee network, etc.) utilizing a network communication protocol determined by the protocol manager 346 of FIG. 3. In some examples, the radio receiver 360 can receive status data from one or more other (e.g., non-lead) life jacket(s) of a swarm network generated and/or formed by the swarm manager 340 of FIG. 3. In some examples, the radio receiver 360 can receive data and/or signal(s) corresponding to one or more request(s) for data associated with the life jacket 300 of FIG. 3. The one or more request(s) for data can be transmitted from one or more other device(s) (e.g., a request from a smartphone, a tablet, a laptop computer, a desktop computer, a server, another life jacket, a rescue vehicle, a cellular base station, a wireless access point, etc.). Data carried by, identified and/or derived from the signal(s) collected and/or received by the radio receiver 360 can be of any type, form and/or format, and can be stored in a computer-readable storage medium such as the example memory 352 of FIG. 3 described below.

The memory 352 of FIG. 3 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 352 can be stored in any file and/or data structure format, organization scheme, and/or arrangement.

In some examples, the memory 352 stores location signal data collected and/or received by the GPS receiver 304 of FIG. 3, motion data sensed, measured and/or detected by the motion sensor 306 of FIG. 3, acceleration data sensed, measured and/or detected by the accelerometer 308 of FIG. 3, ambient temperature data sensed, measured and/or detected by the ambient temperature sensor 310 of FIG. 3, buckle connection data sensed, measured and/or detected by the buckle sensor 312 of FIG. 3, moisture data sensed, measured and/or detected by the moisture sensor 314 of FIG. 3, body temperature data sensed, measured and/or detected by the body temperature sensor 316 of FIG. 3, pulse data sensed, measured and/or detected by the pulse sensor 318 of FIG. 3, and/or respiration data sensed, measured and/or detected by the respiration sensor 320 of FIG. 3. In some examples, the memory 352 stores a unique identifier of the life jacket 300, an assigned storage location (e.g., the intended stowed position) of the life jacket 300, and/or an expiration date of the life jacket 300, as can be identified and/or determined by and/or at the jacket identifier 322 of FIG. 3. In some examples, the memory stores location data identified and/or determined by and/or at the location identifier 324 of FIG. 3.

In some examples, the memory 352 stores jacket health evaluation data and/or jacket health data evaluated, generated and/or processed by and/or at the jacket health evaluator 326 of FIG. 3, movement evaluation data and/or movement data evaluated, generated and/or processed by and/or at the movement evaluator 328 of FIG. 3, installation evaluation data and/or installation data evaluated, generated and/or processed by and/or at the installation evaluator 330 of FIG. 3, immersion evaluation data and/or immersion data evaluated, generated and/or processed by and/or at the immersion evaluator 332 of FIG. 3, user health evaluation data and/or user health data evaluated, generated and/or processed by and/or at the user health evaluator 334 of FIG. 3, and/or battery energy evaluation data and/or battery energy data evaluated, generated and/or processed by and/or at the battery evaluator 336 of FIG. 3.

In some examples, the memory 352 stores operational state management data and/or operational state data generated and/or processed by and/or at the state manager 338 of FIG. 3, swarm management data and/or swarm status data generated and/or processed by and/or at the swarm manager 340 of FIG. 3, status management data and/or status data generated and/or processed by and/or at the status manager 342 of FIG. 3, schedule management data and/or schedules managed, generated and/or processed by and/or at the schedule manager 344 of FIG. 3, and/or network communication protocol data managed, determined and/or processed by and/or at the protocol manager 346 of FIG. 3.

In some examples, the memory 352 stores data and/or information that is presented and/or received via the input device(s) 354 and/or the output device(s) 356 of FIG. 3, and/or, more generally, via the system interface 348 of FIG. 3. In some examples, the memory 352 stores data corresponding to the signal(s) to be transmitted by the radio transmitter 358 of the network interface 350 of FIG. 3, and/or data carried by, identified and/or derived from the signal(s) collected and/or received by the radio receiver 360 of the network interface 350 of FIG. 3.

The memory 352 of FIG. 3 is accessible to the GPS receiver 304, the motion sensor 306, the accelerometer 308, the ambient temperature sensor 310, the buckle sensor 312, the moisture sensor 314, the body temperature sensor 316, the pulse sensor 318, the respiration sensor 320, the jacket identifier 322, the location identifier 324, the jacket health evaluator 326, the movement evaluator 328, the installation evaluator 330, the immersion evaluator 332, the user health evaluator 334, the battery evaluator 336, the state manager 338, the swarm manager 340, the status manager 342, the schedule manger 344, the protocol manager 346, the system interface 348 (including the input device(s) 354 and the output device(s) 356) and/or the network interface 350 (including the radio transmitter 358 and the radio receiver 360) of FIG. 3, and/or, more generally, to the life jacket 300 of FIG. 3.

While an example manner of implementing the life jacket 300 is illustrated in FIG. 3, one or more of the elements, processes and/or devices illustrated in FIG. 3 can be combined, divided, re-arranged, omitted, eliminated and/or implemented in any other way. Further, the battery 302, the GPS receiver 304, the motion sensor 306, the accelerometer 308, the ambient temperature sensor 310, the buckle sensor 312, the moisture sensor 314, the body temperature sensor 316, the pulse sensor 318, the respiration sensor 320, the jacket identifier 322, the location identifier 324, the jacket health evaluator 326, the movement evaluator 328, the installation evaluator 330, the immersion evaluator 332, the user health evaluator 334, the battery evaluator 336, the state manager 338, the swarm manager 340, the status manager 342, the schedule manager 344, the protocol manager 346, the system interface 348, the network interface 350, the memory 352, the input device(s) 354, the output device(s) 356, the radio transmitter 358, the radio receiver 360, and/or, more generally, the example life jacket 300 of FIG. 3 can be implemented by hardware, software, firmware and/or any combination of hardware, software and/or firmware. Thus, for example, any of the battery 302, the GPS receiver 304, the motion sensor 306, the accelerometer 308, the ambient temperature sensor 310, the buckle sensor 312, the moisture sensor 314, the body temperature sensor 316, the pulse sensor 318, the respiration sensor 320, the jacket identifier 322, the location identifier 324, the jacket health evaluator 326, the movement evaluator 328, the installation evaluator 330, the immersion evaluator 332, the user health evaluator 334, the battery evaluator 336, the state manager 338, the swarm manager 340, the status manager 342, the schedule manager 344, the protocol manager 346, the system interface 348, the network interface 350, the memory 352, the input device(s) 354, the output device(s) 356, the radio transmitter 358, the radio receiver 360, and/or, more generally, the example life jacket 300 of FIG. 3 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the battery 302, the GPS receiver 304, the motion sensor 306, the accelerometer 308, the ambient temperature sensor 310, the buckle sensor 312, the moisture sensor 314, the body temperature sensor 316, the pulse sensor 318, the respiration sensor 320, the jacket identifier 322, the location identifier 324, the jacket health evaluator 326, the movement evaluator 328, the installation evaluator 330, the immersion evaluator 332, the user health evaluator 334, the battery evaluator 336, the state manager 338, the swarm manager 340, the status manager 342, the schedule manager 344, the protocol manager 346, the system interface 348, the network interface 350, the memory 352, the input device(s) 354, the output device(s) 356, the radio transmitter 358, the radio receiver 360, and/or, more generally, the example life jacket 300 of FIG. 3 is/are hereby expressly defined to include a non-transitory computer-readable storage device or storage disk including the software and/or firmware. Further still, the battery 302, the GPS receiver 304, the motion sensor 306, the accelerometer 308, the ambient temperature sensor 310, the buckle sensor 312, the moisture sensor 314, the body temperature sensor 316, the pulse sensor 318, the respiration sensor 320, the jacket identifier 322, the location identifier 324, the jacket health evaluator 326, the movement evaluator 328, the installation evaluator 330, the immersion evaluator 332, the user health evaluator 334, the battery evaluator 336, the state manager 338, the swarm manager 340, the status manager 342, the schedule manager 344, the protocol manager 346, the system interface 348, the network interface 350, the memory 352, the input device(s) 354, the output device(s) 356, the radio transmitter 358, the radio receiver 360, and/or, more generally, the example life jacket 300 of FIG. 3 can include one or more element(s), process(es) and/or device(s) in addition to, or instead of, those illustrated in FIG. 3, and/or can include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Figure 9:
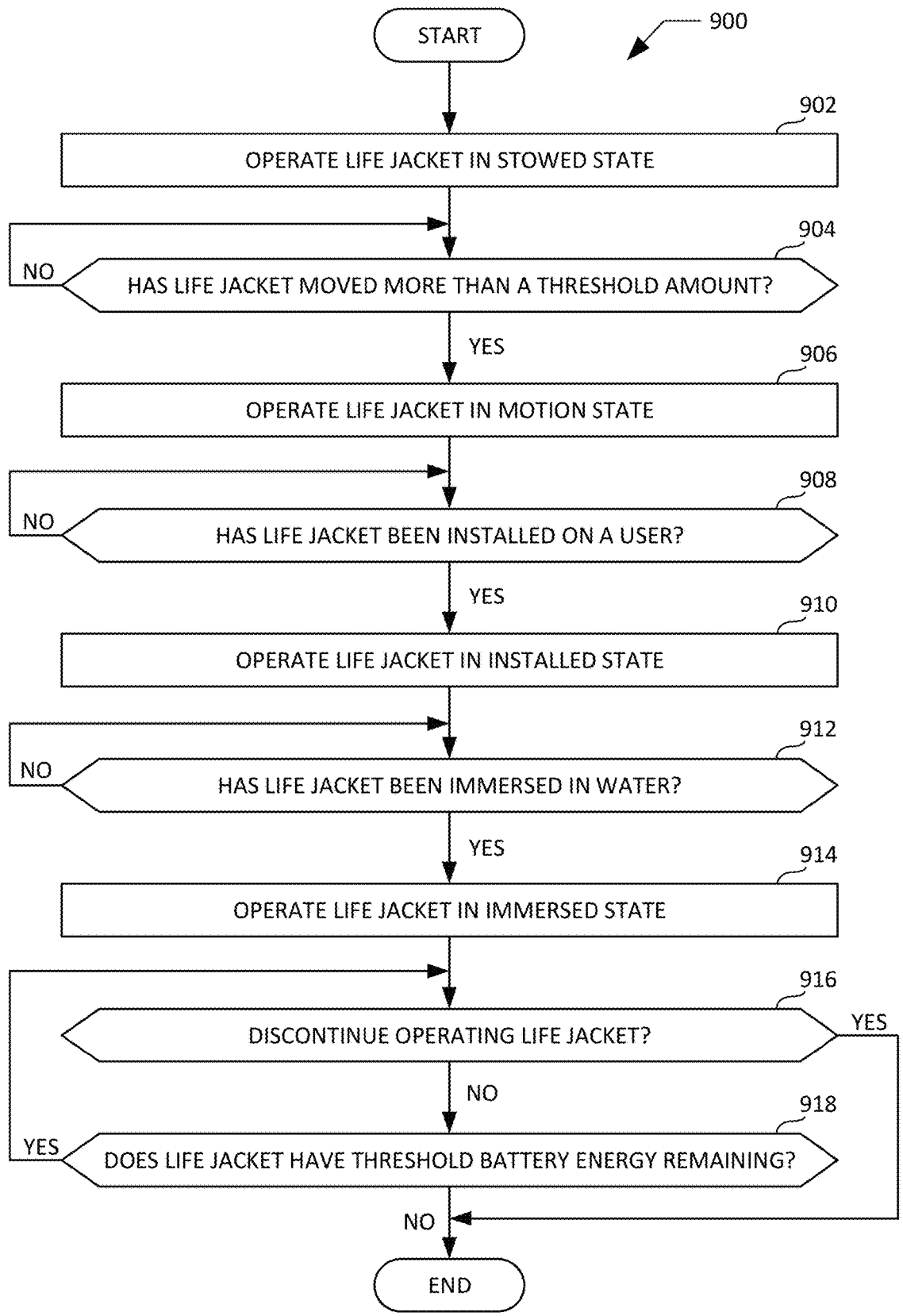
FIG. 9 is a flowchart representative of example machine-readable instructions that can be executed to implement the example life jacket of FIG. 3 to selectively operate the life jacket in one of multiple operational states of the life jacket.
Figure 10:
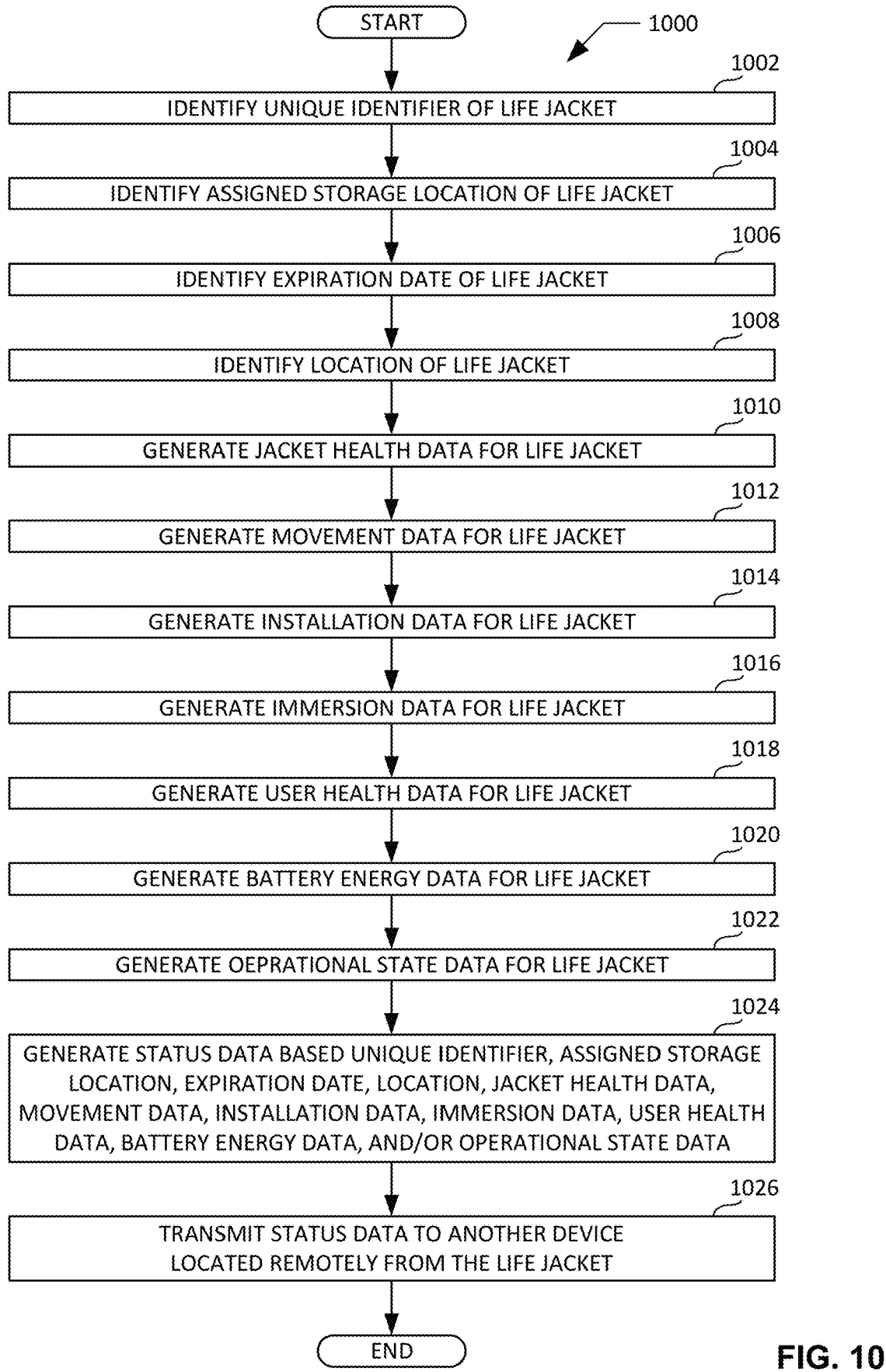
FIG. 10 is a flowchart representative of example machine-readable instructions that can be executed to implement the example life jacket of FIG. 3 to generate and transmit status data for the life jacket.
Figure 11:
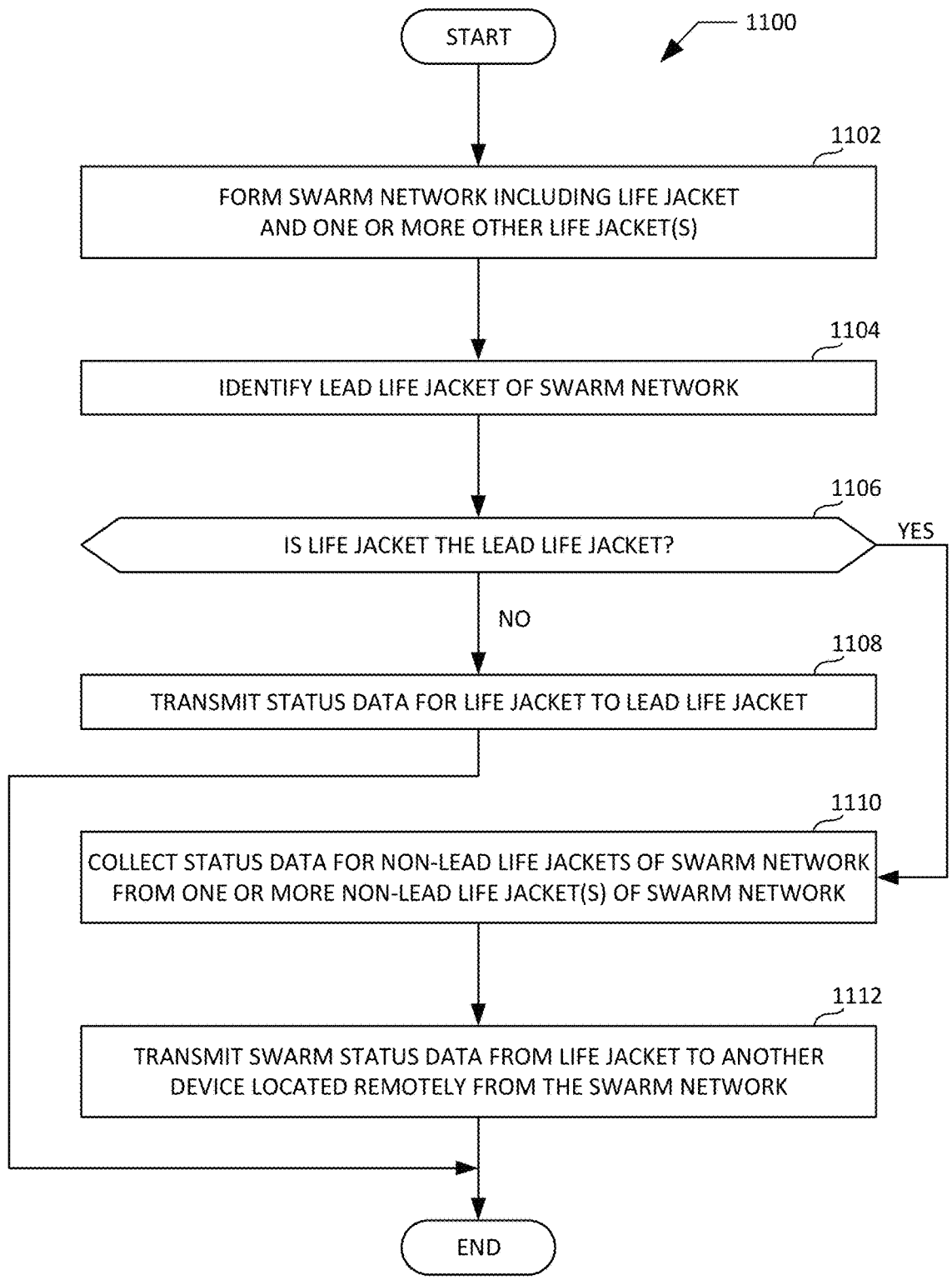
FIG. 11 is a flowchart representative of example machine-readable instructions that can be executed to implement the example life jacket of FIG. 3 to generate and utilize a swarm network including the life jacket.

Flowcharts representative of example hardware logic, machine-readable instructions, hardware implemented state machines, and/or any combination thereof for implementing the life jacket 300 of FIG. 3 are shown in FIGS. 9-11. The machine-readable instructions can be one or more executable program(s) or portion(s) of executable program(s) for execution by a computer processor such as the example processor 1202 shown in the example processor platform 1200 discussed below in connection with FIG. 12. The program(s) can be embodied in software stored on a non-transitory computer-readable storage medium, or a memory associated with the processor 1202, but the entire program(s) and/or parts thereof could alternatively be executed by a device other than the processor 1202 and/or embodied in firmware or dedicated hardware. Further, although the example program(s) is/are described with reference to the flowcharts illustrated in FIGS. 9-11, many other methods of implementing the example life jacket 300 of FIG. 3 can alternatively be used. For example, the order of execution of the blocks can be changed, and/or some of the blocks described can be changed, eliminated, or combined. Additionally or alternatively, any or all of the blocks can be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein can be stored in one or more of a compressed format, an encrypted format, a fragmented format, a packaged format, etc. Machine-readable instructions as described herein can be stored as data (e.g., portions of instructions, code, representations of code, etc.) that can be utilized to create, manufacture, and/or produce machine-executable instructions. For example, the machine-readable instructions can be fragmented and stored on one or more storage device(s) and/or computing device(s) (e.g., servers). The machine-readable instructions can require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions can be stored in multiple parts, which are individually compressed, encrypted, and stored on separate computing devices, wherein the parts when decrypted, decompressed, and combined form a set of executable instructions that implement a program such as that described herein. In another example, the machine-readable instructions can be stored in a state in which they can be read by a computer, but require addition of a library (e.g., a dynamic link library (DLL)), a software development kit (SDK), an application programming interface (API), etc. in order to execute the instructions on a particular computing device or other device. In another example, the machine-readable instructions can need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example processes of FIGS. 9-11 can be implemented using executable instructions (e.g., computer and/or machine-readable instructions) stored on a non-transitory computer and/or machine-readable medium such as a flash memory, a read-only memory, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. can be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 9 is a flowchart representative of example machine-readable instructions 900 that can be executed to implement the example life jacket 300 of FIG. 3 to selectively operate the life jacket 300 in one of multiple operational states of the life jacket 300. The example program 900 of FIG. 9 begins when the state manager 338 of FIG. 3 operates the life jacket 300 in a stowed (e.g., latent) state (block 902). In some examples, the state manager 338 of FIG. 3 enables and/or activates one or more of the GPS receiver 304, the motion sensor 306, the accelerometer 308, the jacket identifier 322, the location identifier 322, the jacket health identifier 326, the movement evaluator 328, and/or the battery evaluator 334 of the life jacket 300 of FIG. 3 in connection with operating the life jacket 300 in the stowed state.

At block 904, the movement evaluator 328 of FIG. 3 determines whether the life jacket 300 of FIG. 3 has moved by more than a threshold amount. For example, the movement evaluator 328 of FIG. 3 can determine whether the life jacket 300 of FIG. 3 has moved by more than a threshold amount based on data obtained from the motion sensor 306 and/or the accelerometer 308 of FIG. 3. If the movement evaluator 328 of FIG. 3 determines at block 904 that the life jacket 300 of FIG. 3 has not moved by more than a threshold amount, control of the example program 900 of FIG. 9 remains at block 904. If the movement evaluator 328 of FIG. 3 instead determines at block 904 that the life jacket 300 of FIG. 3 has moved by more than a threshold amount, control of the example program 900 of FIG. 9 proceeds to block 906.

At block 906, the state manager 338 of FIG. 3 operates the life jacket 300 in a motion state. In some examples, the state manager 338 of FIG. 3 additionally or alternatively (e.g., relative to the stowed state described above) enables and/or activates one or more of the ambient temperature sensor 310, the buckle sensor 312, and/or the installation evaluator 330 of the life jacket 300 of FIG. 3 in connection with operating the life jacket 300 in the motion state.

At block 908, the installation evaluator 330 of FIG. 3 determines whether the life jacket 300 of FIG. 3 has been installed on a user. For example, the installation evaluator 330 of FIG. 3 can determine whether the life jacket 300 of FIG. 3 has been installed on a user based on data obtained from the ambient temperature sensor 310 and/or the buckle sensor 312 of FIG. 3. If the installation evaluator 330 of FIG. 3 determines at block 908 that the life jacket 300 of FIG. 3 has not been installed on a user, control of the example program 900 of FIG. 9 remains at block 908. If the installation evaluator 330 of FIG. 3 instead determines at block 908 that the life jacket 300 of FIG. 3 has been installed on a user, control of the example program 900 of FIG. 9 proceeds to block 910.

At block 910, the state manager 338 of FIG. 3 operates the life jacket 300 in an installed state. In some examples, the state manager 338 of FIG. 3 additionally or alternatively (e.g., relative to the stowed state and/or the motion state described above) enables and/or activates one or more of the moisture sensor 314 and/or the immersion evaluator 332 of the life jacket 300 of FIG. 3 in connection with operating the life jacket 300 in the installed state.

At block 912, the immersion evaluator 332 of FIG. 3 determines whether the life jacket 300 of FIG. 3 has been immersed in water. For example, the immersion evaluator 332 of FIG. 3 can determine whether the life jacket 300 of FIG. 3 has been immersed in water based on data obtained from the moisture sensor 314 of FIG. 3. If the immersion evaluator 332 of FIG. 3 determines at block 912 that the life jacket 300 of FIG. 3 has not been immersed in water, control of the example program 900 of FIG. 9 remains at block 912. If the immersion evaluator 332 of FIG. 3 instead determines at block 912 that the life jacket 300 of FIG. 3 has been immersed in water, control of the example program 900 of FIG. 9 proceeds to block 914.

At block 914, the state manager 338 of FIG. 3 operates the life jacket 300 in an immersed state. In some examples, the state manager 338 of FIG. 3 additionally or alternatively (e.g., relative to the stowed state, the motion state, and/or the installed state described above) enables and/or activates one or more of the body temperature sensor 316, the pulse sensor 318, the respiration sensor 320, and/or the user health evaluator 334 of the life jacket 300 of FIG. 3 in connection with operating the life jacket 300 in the installed state and/or the immersed state.

At block 916, the state manager 338 of FIG. 3 determines whether to discontinue operating the life jacket 300 of FIG. 3. For example, the state manager 338 and/or, more generally, the life jacket 300 of FIG. 3 can receive one or more user input(s) via the system interface 348 of FIG. 3 indicating that operation of the life jacket 300 of FIG. 3 is to be discontinued. If the state manager 338 of FIG. 3 determines at block 916 that operation of the life jacket is not to be discontinued, control of the example program 900 of FIG. 9 proceeds to block 918. If the state manager 338 of FIG. 3 instead determines at block 916 that operation of the life jacket is to be discontinued, the example program 900 of FIG. 9 ends.

At block 918, the battery evaluator 336 of FIG. 3 determines whether the life jacket 300 of FIG. 3 has a threshold amount of battery energy remaining. For example, the battery evaluator 336 of FIG. 3 can determine whether the battery 302 of the life jacket 300 of FIG. 3 has a threshold amount of energy remaining. If the battery evaluator 336 of FIG. 3 determines at block 918 that the life jacket 300 of FIG. 3 has a threshold amount of battery energy remaining, control of the example program 900 of FIG. 9 returns to block 916. If the battery evaluator 336 of FIG. 3 instead determines at block 918 that the life jacket 300 of FIG. 3 does not have a threshold amount of battery energy remaining, a life jacket (e.g., the life jacket 300, and/or a lead life jacket of a swarm network) is notified, and the example program 900 of FIG. 9 ends.

FIG. 10 is a flowchart representative of example machine-readable instructions 1000 that can be executed to implement the example life jacket 300 of FIG. 3 to generate and transmit status data for the life jacket 300. The example program 1000 of FIG. 10 begins when the jacket identifier 322 of FIG. 3 identifies a unique identifier of the life jacket 300 of FIG. 3 (block 1002). In some examples, the jacket identifier 322 of FIG. 3 identifies a unique identifier (e.g., a serial number) of the life jacket 300 of FIG. 3 that differentiates the life jacket 300 from other life jackets.

At block 1004, the jacket identifier 322 of FIG. 3 further identifies an assigned storage location of the life jacket 300 of FIG. 3. In some examples, the jacket identifier 322 of FIG. 3 identifies an assigned position, location and/or object (e.g., a seat number) at which the life jacket 300 of FIG. 3 is stowed (or is to be stowed).

At block 1006, the jacket identifier 322 of FIG. 3 further identifies an expiration date of the life jacket 300 of FIG. 3. In some examples, the jacket identifier 322 of FIG. 3 identifies the expiration date via an expressly-defined expiration date of the life jacket 300 of FIG. 3, or via an expiration date established based on an expressly-defined date of manufacture of the life jacket 300 of FIG. 3.

At block 1008, the location identifier 324 of FIG. 3 identifies a location of the life jacket 300 of FIG. 3. In some examples, the location identifier 324 of FIG. 3 identifies the location of the life jacket 300 of FIG. 3 by deriving the current location from the data and/or signal(s) received by the GPS receiver 304 of FIG. 3.

At block 1010, the jacket health evaluator 326 of FIG. 3 generates jacket health data for the life jacket 300 of FIG. 3. In some examples, the jacket health evaluator 326 of FIG. 3 generates jacket health data for the life jacket 300 of FIG. 3 based on the expiration date identified and/or determined by the jacket identifier 322 of FIG. 3.

At block 1012, the movement evaluator 328 of FIG. 3 generates movement data for the life jacket 300 of FIG. 3. In some examples, the movement evaluator 328 of FIG. 3 generates movement data for the life jacket 300 of FIG. 3 based on motion data sensed, measured and/or detected by the motion sensor 306 of FIG. 3, and/or based on acceleration data sensed, measured and/or detected by the accelerometer 308 of FIG. 3.

At block 1014, the installation evaluator 330 of FIG. 3 generates installation data for the life jacket 300 of FIG. 3. In some examples, the installation evaluator 330 of FIG. 3 generates installation data for the life jacket 300 of FIG. 3 based on ambient temperature data sensed, measured and/or detected by the ambient temperature sensor 310 of FIG. 3, and/or based on buckle connection data sensed, measured and/or detected by the buckle sensor 312 of FIG. 3

At block 1016, the immersion evaluator 332 of FIG. 3 generates immersion data for the life jacket 300 of FIG. 3. In some examples, the immersion evaluator 332 of FIG. 3 generates immersion data for the life jacket 300 of FIG. 3 based on moisture data sensed, measured and/or detected by the moisture sensor 314 of FIG. 3.

At block 1018, the user health evaluator 334 of FIG. 3 generates user health data for the life jacket 300 of FIG. 3. In some examples, the user health evaluator 334 of FIG. 3 generates user health data for the life jacket 300 of FIG. 3 based on body temperature data sensed, measured and/or detected by the body temperature sensor 316 of FIG. 3, based on pulse data sensed, measured and/or detected by the pulse sensor 318 of FIG. 3, and/or based on respiration data sensed, measured and/or detected by the respiration sensor 320 of FIG. 3.

At block 1020, the battery evaluator 336 of FIG. 3 generates battery energy data for the life jacket 300 of FIG. 3. In some examples, the battery evaluator 336 of FIG. 3 generates battery energy data for the life jacket 300 of FIG. 3 based on a current state of charge of the battery 302 of FIG. 3.

At block 1022, the state manager 338 of FIG. 3 generates operational state data for the life jacket 300 of FIG. 3. In some examples, the state manager 338 of FIG. 3 generates operational state data for the life jacket 300 of FIG. 3 based on the movement data generated by the movement evaluator 328 of FIG. 3, based on the installation data generated by the installation evaluator 330 of FIG. 3, and/or based on the immersion data generated by the immersion evaluator 332 of FIG. 3.

At block 1024, the status manager 342 of FIG. 3 generates status data for the life jacket 300 of FIG. 3 based on the unique identifier, the assigned storage location, the expiration date, the location, the jacket health data, the movement data, the installation data, the immersion data, the user health data, the battery data, and/or the operation state data. In some examples, the information included within the status data generated by the status manager 342 of FIG. 3 is based on an operational state within which the life jacket 300 of FIG. 3 is operating at the time the status manager 342 of FIG. 3 generates the status data.

At block 1026 the radio transmitter 358 of FIG. 3 transmits the status data to another device located remotely from the life jacket 300 of FIG. 3. In some examples, the other device is a smartphone, a tablet, a laptop computer, a desktop computer, a server, another life jacket, a rescue vehicle, a cellular base station, or a wireless access point. In some examples, the radio transmitter 358 of FIG. 3 transmits the status data over a network (e.g., a cellular network, a Wi-Fi network, a Bluetooth network, a Zigbee network, etc.) utilizing a network communication protocol determined by the protocol manager 346 of FIG. 3. Following block 1026, the example program 1000 of FIG. 10 ends.

FIG. 11 is a flowchart representative of example machine-readable instructions 1100 that can be executed to implement the example life jacket 300 of FIG. 3 to generate and utilize a swarm network including the life jacket 300. The example program 1100 of FIG. 11 begins when the swarm manager 340 of FIG. 3 forms a swarm network including the life jacket 300 of FIG. 3 and one or more other life jacket(s) (block 1102). In some examples, the swarm manager 340 of FIG. 3 forms the swarm network while the life jacket 300 is in a stowed (e.g., latent) state. In some examples, the swarm network formed by the swarm manager 340 of FIG. 3 includes a group of life jackets that are located on a vehicle (e.g., on an aircraft). In some examples, each life jacket of the swarm network formed by the swarm manager 340 of FIG. 3 is structured and/or configured in a manner that enables the life jacket to transmit and/or receive communications (e.g., radio signals and/or data) to and/or from at least one of the other life jacket(s) of the swarm network.

At block 1104, the swarm manager 340 of FIG. 3 identifies a lead life jacket of the swarm network. In some examples, the swarm manager 340 of FIG. 3 identifies the life jacket 300 of FIG. 3 as the lead life jacket of the swarm network. In other examples, the swarm manager 340 of FIG. 3 instead identifies one of the other life jacket(s) of the swarm network as the lead life jacket of the swarm network. In some examples, the swarm manager 340 of FIG. 3 identifies the lead life jacket of the swarm network as the life jacket from among the multiple life jackets of the swarm network that demonstrates the greatest signal strength for radio communications from the radio transmitter 358 and/or to the radio receiver 360 of FIG. 3, and/or as the life jacket from among the multiple life jackets of the swarm network that demonstrates the greatest remaining battery energy.

At block 1106, the swarm manager 340 of FIG. 3 determines whether the life jacket 300 of FIG. 3 is the lead life jacket of the swarm network. If the swarm manager 340 of FIG. 3 determines at block 1106 that the life jacket 300 of FIG. 3 is not the lead life jacket of the swarm network, control of the example program 1100 of FIG. 11 proceeds to block 1108. If the swarm manager 340 of FIG. 3 instead determines at block 1106 that the life jacket 300 of FIG. 3 is the lead life jacket of the swarm network, control of the example program 1100 of FIG. 11 proceeds to block 1110.

At block 1108, the radio transmitter 358 of FIG. 3 transmits status data for the life jacket 300 of FIG. 3 to the lead life jacket of the swarm network. In some examples, the radio transmitter 358 of FIG. 3 transmits the status data over a network (e.g., a cellular network, a Wi-Fi network, a Bluetooth network, a Zigbee network, etc.) utilizing a network communication protocol determined by the protocol manager 346 of FIG. 3. Following block 1108, the example program 1100 of FIG. 11 ends.

At block 1110, the radio receiver 360 of FIG. 3 collects status data for the non-lead life jackets of the swarm network from one or more of the non-lead life jacket(s) of the swarm network. In some examples, the radio receiver 360 of FIG. 3 collects the status data over a network (e.g., a cellular network, a Wi-Fi network, a Bluetooth network, a Zigbee network, etc.) utilizing a network communication protocol determined by the protocol manager 346 of FIG. 3.

At block 1112, the radio transmitter 358 of FIG. 3 transmits swarm status data from the life jacket 300 of FIG. 3 (e.g., the lead life jacket of the swarm network) to another device located remotely from the life jacket 300 of FIG. 3, and/or located remotely from the swarm network. In some examples, the other device is a rescue vehicle, a cellular base station, or a wireless access point. In some examples, the radio transmitter 358 of FIG. 3 transmits the swarm status data over a network (e.g., a cellular network, a Wi-Fi network, a Bluetooth network, a Zigbee network, etc.) utilizing a network communication protocol determined by the protocol manager 346 of FIG. 3. Following block 1112, the example program 1100 of FIG. 11 ends.

Figure 12:
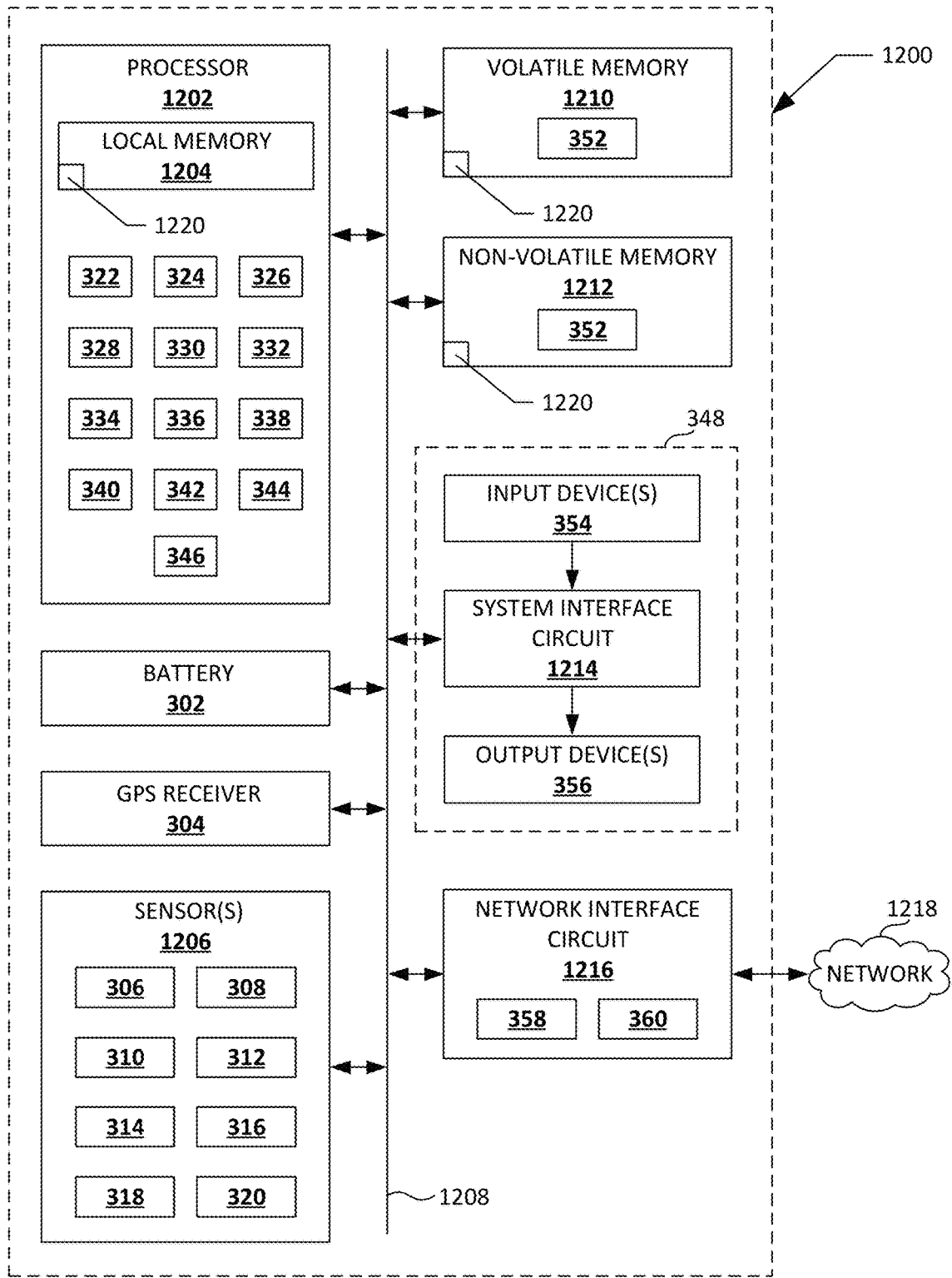
FIG. 12 is a block diagram of an example processor platform structured to execute the example machine-readable instructions of FIGS. 9-11 to implement the example life jacket of FIG. 3.

FIG. 12 is a block diagram of an example processor platform 1200 structured to execute the example machine-readable instructions 900 of FIG. 9, the example machine-readable instructions 1000 of FIG. 10, and the example machine-readable instructions 1100 of FIG. 11 to implement the example life jacket 300 of FIG. 3. The processor platform 1200 of the illustrated example includes a processor 1202. The processor 1202 of the illustrated example is hardware. For example, the processor 1202 can be implemented by one or more integrated circuit(s), logic circuit(s), microprocessor(s), GPU(s), DSP(s), microcontroller(s), processor(s), or microcontroller(s) from any desired family or manufacturer. The hardware processor can be a semiconductor based (e.g., silicon based) device. In this example, the processor 1202 implements the example jacket identifier 322, the example location identifier 324, the example jacket health evaluator 326, the example movement evaluator 328, the example installation evaluator 330, the example immersion evaluator 332, the example user health evaluator 334, the example battery evaluator 336, the example state manager 338, the example swarm manager 340, the example status manager 342, the example schedule manager 344, and the example protocol manager 346 of FIG. 3.

The processor 1202 of the illustrated example includes a local memory 1204 (e.g., a cache). The processor 1202 is in communication with the example battery 302 and the example GPS receiver 304 of FIG. 3, as well as one or more example sensors 1206 (including the example motion sensor 306, the example accelerometer 308, the example ambient temperature sensor 310, the example buckle sensor 312, the example moisture sensor 314, the example body temperature sensor 316, the example pulse sensor 318, and the example respiration sensor 320 of FIG. 3) via a bus 1208. The processor 1202 is also in communication with a main memory including a volatile memory 1210 and a non-volatile memory 1212 via the bus 1208. The volatile memory 1210 can be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1214 can be implemented by flash memory and/or any other desired type of memory device. Access to the main memory 1210, 1212 is controlled by a memory controller. In the illustrated example of FIG. 12, one or more of the volatile memory 1210 and/or the non-volatile memory 1214 implement(s) the example memory 352 of FIG. 3.

The processor platform 1200 of the illustrated example also includes a system interface circuit 1214. The system interface circuit 1214 can be implemented by any type of interface standard, such as an Ethernet interface, a universal serial bus (USB), a Bluetooth® interface, a near field communication (NFC) interface, and/or a PCI express interface. In the illustrated example, one or more input device(s) 354 of FIG. 3 are connected to the system interface circuit 1214. The input device(s) 354 permit(s) a user to enter data and/or commands into the processor 1202. The input device(s) 354 can be implemented by, for example, a button, a switch, and/or a microphone. One or more output device(s) 356 of FIG. 3 are also connected to the system interface circuit 1214 of the illustrated example. The output device(s) 356 can be implemented, for example, by a light emitting diode and/or a liquid crystal display for presenting visual information, a speaker for presenting audible information, and/or a haptic device for presenting tactile information. In the illustrated example, the input device(s) 354, the output device(s) 356, and the system interface circuit 1214 collectively implement the example system interface 348 of FIG. 3.

The processor platform 1200 of the illustrated example also includes a network interface circuit 1216. The network interface circuit 1216 can be implemented by any type of interface standard, such as an Ethernet interface, a universal serial bus (USB), a Bluetooth® interface, a near field communication (NFC) interface, and/or a PCI express interface. In the illustrated example of FIG. 12, the network interface circuit 1216 includes the example radio transmitter 358 and the example radio receiver 360 of FIG. 3 to facilitate the exchange of data and/or signals with other devices (e.g., a smartphone, a tablet, a laptop computer, a desktop computer, a server, another life jacket, a rescue vehicle, a cellular base station, a wireless access point, etc.) via a network 1218 (e.g., a cellular network, a Wi-Fi network, a Bluetooth network, a Zigbee network, etc.).

Coded instructions 1220 including the machine-readable instructions 900 of FIG. 9, the machine-readable instructions 1000 of FIG. 10, and the machine-readable instructions 1100 of FIG. 11 can be stored in the local memory 1204, in the volatile memory 1210, in the non-volatile memory 1214, and/or on a removable non-transitory computer-readable storage medium such as a flash memory stick.

From the foregoing, it will be appreciated that digital life jackets and associated methods have been disclosed that advantageously include an array and/or collection of sensor(s) and/or processing element(s) that are individually and/or collectively configured to determine and/or generate transmittable status data indicating whether the life jacket has moved (e.g., relative to an assigned storage location) by more than a threshold amount, whether the life jacket has been installed (e.g., placed on and/or connected to) a user, whether the life jacket has been immersed in water, and/or user health status associated with a user wearing the life jacket. Such detailed status data can advantageously be transmitted from example digital life jackets disclosed herein to rescue vehicles and/or services to inform such rescue vehicles and/or services in a manner that can be of critical importance and/or assistance with regard to implementing efficient rescue efforts. Example digital life jackets disclosed herein are networkable with one another. In this regard, example digital life jackets disclosed herein are advantageously structured and/or configured to communicate with one another via a swarm network formed by two or more of the life jackets. Example digital life jackets disclosed herein identify a lead life jacket (e.g., a gateway life jacket) for the swarm network. The lead life jacket transmits swarm status data that includes status data for all members of the swarm network, thereby advantageously increasing the efficiency of search and rescue efforts, and also advantageously reducing the amount of power consumed by the non-lead members of the swarm network.

In some examples, a life jacket is disclosed. In some disclosed examples, the life jacket comprises a state manager and a swarm manager. In some disclosed examples, the state manager is configured to selectively operate the life jacket in one of multiple operational states of the life jacket based on data obtained from one or more sensors of the life jacket. In some disclosed examples, the swarm manager is configured to form a swarm network including the life jacket and one or more other life jackets.

In some disclosed examples of the life jacket, the one or more sensors include at least one of a motion sensor, an accelerometer, a temperature sensor, a buckle sensor, a moisture sensor, or a physiologic sensor.

In some disclosed examples of the life jacket, the multiple operational states include a stowed state and at least one of a motion state, an installed state, or an immersed state.

In some disclosed examples, the life jacket further comprises a movement evaluator configured to determine whether the life jacket has moved by more than a threshold amount. In some disclosed examples, the state manager is configured to operate the life jacket in the stowed state prior to the movement evaluator determining that the life jacket has moved by more than the threshold amount.

In some disclosed examples of the life jacket, the state manager is configured to operate the life jacket in the motion state in response to the movement evaluator determining that the life jacket has moved by more than the threshold amount.

In some disclosed examples, the life jacket further comprises an installation evaluator configured to determine whether the life jacket has been installed on a user. In some disclosed examples, the state manager is configured to operate the life jacket in the installed state in response to the installation evaluator determining that the life jacket has been installed on the user.

In some disclosed examples, the life jacket further comprises an immersion evaluator configured to determine whether the life jacket has been immersed in water. In some disclosed examples, the state manager is configured to operate the life jacket in the immersed state in response to the immersion evaluator determining that the life jacket has been immersed in the water.

In some disclosed examples of the life jacket, the swarm manager is configured to form the swarm network while the life jacket is operating in the stowed state.

In some disclosed examples, the life jacket further comprises a status manager configured to generate status data for the life jacket. In some disclosed examples, the life jacket further comprises a transmitter configured to transmit the status data from the life jacket to another device located remotely from the life jacket.

In some disclosed examples of the life jacket, the status data includes at least one of a unique identifier, an assigned storage location, an expiration date, a location, jacket health data, movement data, installation data, immersion data, user health data, battery energy data, or operational state data of the life jacket.

In some disclosed examples of the life jacket, the swarm manager is configured to identify a lead life jacket of the swarm network from among the life jacket and the one or more other life jackets of the swarm network. In some disclosed examples, the lead life jacket is to transmit swarm status data from the lead life jacket to a remotely located rescue vehicle. In some disclosed examples, the swarm status data is to indicate a respective status for the life jacket and for each of the one or more other life jackets of the swarm network.

In some examples, a method is disclosed. In some disclosed examples, the method comprises selectively operating a life jacket, by executing a computer-readable instruction with one or more processors of the life jacket, in one of multiple operational states of the life jacket based on data obtained from one or more sensors of the life jacket. In some disclosed examples, the method further comprises forming a swarm network including the life jacket and one or more other life jackets.

In some disclosed examples of the method, the one or more sensors include at least one of a motion sensor, an accelerometer, a temperature sensor, a buckle sensor, a moisture sensor, or a physiologic sensor.

In some disclosed examples of the method, the multiple operational states include a stowed state and at least one of a motion state, an installed state, or an immersed state.

In some disclosed examples, the method further comprises determining, by executing a computer-readable instruction with the one or more processors, whether the life jacket has moved by more than a threshold amount. In some disclosed examples, the method further comprises operating the life jacket in the stowed state prior to determining that the life jacket has moved by more than the threshold amount.

In some disclosed examples, the method further comprises operating the life jacket in the motion state in response to determining that the life jacket has moved by more than the threshold amount.

In some disclosed examples, the method further comprises determining, by executing a computer-readable instruction with the one or more processors, whether the life jacket has been installed on a user. In some disclosed examples, the method further comprises operating the life jacket in the installed state in response to determining that the life jacket has been installed on the user.

In some disclosed examples, the method further comprises determining, by executing a computer-readable instruction with the one or more processors, whether the life jacket has been immersed in water. In some disclosed examples, the method further comprises operating the life jacket in the immersed state in response to determining that the life jacket has been immersed in the water.

In some disclosed examples of the method, forming the swarm network occurs while the life jacket is operating in the stowed state.

In some disclosed examples, the method further comprises generating, by executing a computer-readable instruction with the one or more processors, status data for the life jacket. In some disclosed examples, the method further comprises transmitting, by executing a computer-readable instruction with the one or more processors, the status data from the life jacket to another device located remotely from the life jacket.

In some disclosed examples of the method, the status data includes at least one of a unique identifier, an assigned storage location, an expiration date, a location, jacket health data, movement data, installation data, immersion data, user health data, battery energy data, or operational state data of the life jacket.

In some disclosed examples, the method further comprises identifying, by executing a computer-readable instruction with the one or more processors, a lead life jacket of the swarm network from among the life jacket and the one or more other life jackets of the swarm network. In some disclosed examples, the lead life jacket is to transmit swarm status data from the lead life jacket to a remotely located rescue vehicle. In some disclosed examples, the swarm status data is to indicate a respective status for the life jacket and for each of the one or more other life jackets of the swarm network.

In some examples, a non-transitory computer-readable medium comprising instructions is disclosed. In some disclosed examples, the instructions, when executed, cause one or more processors of a life jacket to selectively operate the life jacket in one of multiple operational states of the life jacket based on data obtained from one or more sensors of the life jacket. In some disclosed examples, the instructions, when executed, further cause the one or more processors to form a swarm network including the life jacket and one or more other life jackets.

In some disclosed examples of the non-transitory computer-readable storage medium, the one or more sensors include at least one of a motion sensor, an accelerometer, a temperature sensor, a buckle sensor, a moisture sensor, or a physiologic sensor.

In some disclosed examples of the non-transitory computer-readable storage medium, the multiple operational states include a stowed state and at least one of a motion state, an installed state, or an immersed state.

In some disclosed examples, the instructions, when executed, cause the one or more processors to determine whether the life jacket has moved by more than a threshold amount. In some disclosed examples, the instructions, when executed, cause the one or more processors to operate the life jacket in the stowed state prior to determining that the life jacket has moved by more than the threshold amount.

In some disclosed examples, the instructions, when executed, cause the one or more processors to operate the life jacket in the motion state in response to determining that the life jacket has moved by more than the threshold amount.

In some disclosed examples, the instructions, when executed, cause the one or more processors to determine whether the life jacket has been installed on a user. In some disclosed examples, the instructions, when executed, cause the one or more processors to operate the life jacket in the installed state in response to determining that the life jacket has been installed on the user.

In some disclosed examples, the instructions, when executed, cause the one or more processors to determine whether the life jacket has been immersed in water. In some disclosed examples, the instructions, when executed, cause the one or more processors to operate the life jacket in the immersed state in response to determining that the life jacket has been immersed in the water.

In some disclosed examples, the instructions, when executed, cause the one or more processors to form the swarm network while the life jacket is operating in the stowed state.

In some disclosed examples, the instructions, when executed, cause the one or more processors to generate status data for the life jacket. In some disclosed examples, the instructions, when executed, cause the one or more processors to transmit the status data from the life jacket to another device located remotely from the life jacket.

In some disclosed examples of the non-transitory computer-readable storage medium, the status data includes at least one of a unique identifier, an assigned storage location, an expiration date, a location, jacket health data, movement data, installation data, immersion data, user health data, battery energy data, or operational state data of the life jacket.

In some disclosed examples, the instructions, when executed, cause the one or more processors to identify a lead life jacket of the swarm network from among the life jacket and the one or more other life jackets of the swarm network. In some disclosed examples, the lead life jacket is to transmit swarm status data from the lead life jacket to a remotely located rescue vehicle. In some disclosed examples, the swarm status data is to indicate a respective status for the life jacket and for each of the one or more other life jackets of the swarm network.

In some disclosed examples, the instructions, when executed, cause the one or more processors to generate vital signs status data for an individual on whom the life jacket is installed. In some disclosed examples, the instructions, when executed, cause the one or more processors to transmit the vital signs status data from the life jacket to another device located remotely from the life jacket.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A life jacket, comprising:
a state manager configured to selectively operate the life jacket in one of multiple operational states of the life jacket based on data obtained from one or more sensors of the life jacket; and
a swarm manager configured to:
form a swarm network including the life jacket and one or more other life jackets; and
identify a lead life jacket of the swarm network from among the life jacket and the one or more other life jackets of the swarm network, the lead life jacket to transmit swarm status data indicating a respective status for the life jacket and for each of the one or more other life jackets of the swarm network.

2. The life jacket of claim 1, wherein the one or more sensors include at least one of a motion sensor, an accelerometer, a temperature sensor, a buckle sensor, a moisture sensor, or a physiologic sensor.

3. The life jacket of claim 1, wherein the multiple operational states include a stowed state and at least one of a motion state, an installed state, or an immersed state.

4. A life jacket, comprising:
a state manager configured to selectively operate the life jacket in one of multiple operational states of the life jacket based on data obtained from one or more sensors of the life jacket, the multiple operational states including a stowed state and at least one of a motion state, an installed state, or an immersed state;

a movement evaluator configured to determine whether the life jacket has moved by more than a threshold amount, wherein the state manager is configured to operate the life jacket in the stowed state prior to the movement evaluator determining that the life jacket has moved by more than the threshold amount; and a swarm manager configured to form a swarm network including the life jacket and one or more other life jackets.

5. The life jacket of claim 4, wherein the state manager is configured to operate the life jacket in the motion state in response to the movement evaluator determining that the life jacket has moved by more than the threshold amount.

6. The life jacket of claim 4, further comprising an installation evaluator configured to determine whether the life jacket has been installed on a user, wherein the state manager is configured to operate the life jacket in the installed state in response to the installation evaluator determining that the life jacket has been installed on the user.

7. The life jacket of claim 4, further comprising an immersion evaluator configured to determine whether the life jacket has been immersed in water, wherein the state manager is configured to operate the life jacket in the immersed state in response to the immersion evaluator determining that the life jacket has been immersed in the water.

8. The life jacket of claim 3, wherein the swarm manager is configured to form the swarm network while the life jacket is operating in the stowed state.

9. The life jacket of claim 1, further comprising:
a status manager configured to generate status data for the life jacket; and
a transmitter configured to transmit the status data from the life jacket to another device located remotely from the life jacket.

10. The life jacket of claim 9, wherein the status data includes at least one of a unique identifier, an assigned storage location, an expiration date, a location, jacket health data, movement data, installation data, immersion data, user health data, battery energy data, or operational state data of the life jacket.

11. The life jacket of claim 1, wherein the lead life jacket is to transmit the swarm status data from the lead life jacket to a remotely located rescue vehicle.

12. A method, comprising:
selectively operating a life jacket, by executing a computer-readable instruction with one or more processors of the life jacket, in one of multiple operational states of the life jacket based on data obtained from one or more sensors of the life jacket;
forming a swarm network including the life jacket and one or more other life jackets; and
identifying, by executing a computer-readable instruction with the one or more processors, a lead life jacket of the swarm network from among the life jacket and the one or more other life jackets of the swarm network, the lead life jacket to transmit swarm status data indicating a respective status for the life jacket and for each of the one or more other life jackets of the swarm network.

13. The method of claim 12, wherein the one or more sensors include at least one of a motion sensor, an accelerometer, a temperature sensor, a buckle sensor, a moisture sensor, or a physiologic sensor.

14. The method of claim 12, wherein the multiple operational states include a stowed state and at least one of a motion state, an installed state, or an immersed state.

15. A method, comprising:
selectively operating a life jacket, by executing a computer-readable instruction with one or more processors of the life jacket, in one of multiple operational states of the life jacket based on data obtained from one or more sensors of the life jacket, the multiple operational states including a stowed state and at least one of a motion state, an installed state, or an immersed state;
determining, by executing a computer-readable instruction with the one or more processors, whether the life jacket has moved by more than a threshold amount;
operating the life jacket in the stowed state prior to determining that the life jacket has moved by more than the threshold amount; and
forming a swarm network including the life jacket and one or more other life jackets.

16. The method of claim 15, further comprising operating the life jacket in the motion state in response to determining that the life jacket has moved by more than the threshold amount.

17. The method of claim 15, further comprising:
determining, by executing a computer-readable instruction with the one or more processors, whether the life jacket has been installed on a user; and
operating the life jacket in the installed state in response to determining that the life jacket has been installed on the user.

18. The method of claim 15, further comprising:
determining, by executing a computer-readable instruction with the one or more processors, whether the life jacket has been immersed in water; and
operating the life jacket in the immersed state in response to determining that the life jacket has been immersed in the water.

19. The method of claim 14, wherein forming the swarm network occurs while the life jacket is operating in the stowed state.

20. The method of claim 12, further comprising:
generating, by executing a computer-readable instruction with the one or more processors, status data for the life jacket; and
transmitting, by executing a computer-readable instruction with the one or more processors, the status data from the life jacket to another device located remotely from the life jacket.

21. The method of claim 20, wherein the status data includes at least one of a unique identifier, an assigned storage location, an expiration date, a location, jacket health data, movement data, installation data, immersion data, user health data, battery energy data, or operational state data of the life jacket.

22. The method of claim 12, wherein the lead life jacket is to transmit the swarm status data from the lead life jacket to a remotely located rescue vehicle.

* * * * *